US008908627B2

(12) United States Patent
Wu et al.

(10) Patent No.: US 8,908,627 B2
(45) Date of Patent: Dec. 9, 2014

(54) DATA PROCESSING METHOD AND SYSTEM

(71) Applicant: Huawei Technologies Co., Ltd., Shenzhen, Guangdong (CN)

(72) Inventors: Wenfu Wu, Shanghai (CN); Weihua Hu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 13/672,307

(22) Filed: Nov. 8, 2012

(65) Prior Publication Data

US 2013/0079016 A1 Mar. 28, 2013

Related U.S. Application Data

(63) Continuation of application No. 12/371,078, filed on Feb. 13, 2009, now Pat. No. 8,325,675, which is a continuation of application No. PCT/CN2007/070384, filed on Jul. 30, 2007.

(30) Foreign Application Priority Data

Aug. 15, 2006 (CN) .......................... 2006 1 0115381

(51) Int. Cl.
*H04W 4/00* (2009.01)
*H04W 36/00* (2009.01)
*H04L 12/46* (2006.01)
*H04W 36/14* (2009.01)

(52) U.S. Cl.
CPC ....... *H04W 36/0066* (2013.01); *H04L 12/4633* (2013.01); *H04W 36/0011* (2013.01); *H04W 36/14* (2013.01)
USPC ............................. 370/329; 370/338; 370/392

(58) Field of Classification Search
CPC . H04W 36/12; H04W 36/0033; H04W 36/00; H04W 36/32; H04L 12/4633
See application file for complete search history.

(56) References Cited

U.S. PATENT DOCUMENTS 8,462,710 B2 * 6/2013 Walker et al. ................. 370/329
2002/0110104 A1 8/2002 Surdila et al.
(Continued)

FOREIGN PATENT DOCUMENTS

CN             1523798 A     8/2004
JP             2002094562 A     3/2002
(Continued)

OTHER PUBLICATIONS

"TS 23.060—3$^{rd}$ Generation Partnership Project; Technical Specification Group Services and System Aspects; General Packet Radio Service (GPRS); Service Description; Stage 2 (Release 6)," 3GPP Technical Specification, Jun. 2005, V6.9.0, 3GPP, Valbonne, France.

(Continued)

*Primary Examiner* — Jung Park
(74) *Attorney, Agent, or Firm* — Huawei Technologies Co., Ltd

(57) ABSTRACT

A data processing method when the handover or change appears between systems includes: a Mobility Management network element sends a data forwarding tunnel identifier of a target side processing network element to a user plane anchor network element, obtains a data forwarding tunnel identifier of the user plane anchor network element, and sends the data forwarding tunnel identifier of the user plane anchor network element to a source data forwarding network element.

11 Claims, 19 Drawing Sheets

(56) References Cited

U.S. PATENT DOCUMENTS

| | | | |
|---|---|---|---|
| 2003/0021256 A1 | 1/2003 | Lee | |
| 2003/0169725 A1* | 9/2003 | Ahmavaara et al. | 370/352 |
| 2004/0137918 A1 | 7/2004 | Varonen et al. | |
| 2004/0205247 A1* | 10/2004 | Ahn | 709/245 |
| 2006/0126565 A1 | 6/2006 | Shaheen | |
| 2007/0019575 A1 | 1/2007 | Shaheen | |
| 2007/0041346 A1 | 2/2007 | Bae et al. | |
| 2007/0213059 A1* | 9/2007 | Shaheen | 455/436 |
| 2007/0213060 A1* | 9/2007 | Shaheen | 455/436 |
| 2007/0254692 A1 | 11/2007 | McCoy | |
| 2008/0025263 A1* | 1/2008 | Pelkonen | 370/332 |
| 2008/0188223 A1* | 8/2008 | Vesterinen et al. | 455/436 |
| 2008/0192697 A1* | 8/2008 | Shaheen | 370/331 |
| 2008/0268846 A1* | 10/2008 | Shaheen | 455/436 |
| 2009/0190549 A1 | 7/2009 | Kim et al. | |
| 2010/0061340 A1* | 3/2010 | Ramle et al. | 370/331 |
| 2010/0322068 A1* | 12/2010 | Grahn et al. | 370/217 |
| 2012/0077500 A1* | 3/2012 | Shaheen | 455/436 |

FOREIGN PATENT DOCUMENTS

| | | |
|---|---|---|
| JP | 2005311580 A | 11/2005 |
| JP | 2007518344 A | 7/2007 |
| JP | 2008523732 A | 7/2008 |

OTHER PUBLICATIONS

"TS 23.060—$3^{rd}$ Generation Partnership Project; Technical Specification Group Services and System Aspects; General Packet Radio Service (GPRS); Service Description; Stage 2 (Release 7)," 3GPP Technical Specification, Jun. 2006, V7.1.0, 3GPP, Valbonne, France.

"TR 23.809—$3^{rd}$ Generation Partnership Project; Technical Specification Group Services and System Aspects; One Tunnel Functional Description (Release 7)," 3GPP Technical Report, May 2006, V0.2.0, 3GPP, Valbonne, France.

"TR 23.809—$3^{rd}$ Generation Partnership Project; Technical Specification Group Services and System Aspects; One Tunnel Functional Description (Release 7)," 3GPP Technical Report, Jul. 2006, V0.3.0, 3GPP, Valbonne, France.

"TR 23.873—$3^{rd}$ Generation Partnership Project; Technical Specification Group Services and System Aspects; Feasibility Study for Transport and Control Separation in the PS CN Domain (Release 4)," 3GPP Technical Report, Mar. 2001, V4.0.0, 3GPP, Valbonne, France.

"TR 23.882—$3^{rd}$ Generation Partnership Project; Technical Specification Group Services and System Aspects; 3GPP System Architecture Evolution: Report on Technical Options and Conclusions (Release 7)," 3GPP Technical Report, Nov. 2005, V0.8.1, 3GPP, Valbonne, France.

"TR 23.882—$3^{rd}$ Generation Partnership Project; Technical Specification Group Services and System Aspects; 3GPP System Architecture Evolution: Report on Technical Options and Conclusions (Release 7)," 3GPP Technical Report, Jul. 2006, V1.3.0, 3GPP, Valbonne, Frnace.

"TS 43.129—$3^{rd}$ Generation Partnership Project; Technical Specification Group GERAN; Packet-Switched Handover for GERAN A/Gb Mode; Stage 2 (Release 6)," 3GPP Technical Specification, Jan. 2006, V6.6.0, 3GPP, Valbonne, France.

"TS 43.129—$^{rd}$ Generation Partnership Project; Technical Specification Group GERAN; Packet-Switched Handover for GERAN A/Gb Mode; Stage 2 (Release 6)," 3GPP Technical Specification, Jun. 2006, V6.8.0, 3GPP, Valbonne, France.

"S2-062450—SGSN Controlled Bearer Optimization; Impacts on Intersystem Change," 3GPP TSG SA WG2 Architecture—S2#53, Jun. 26-30, 2006, 3GPP, Valbonne, France.

"S2-062551—Impacts on PS Handover," 3GPP TSG SA WG2 Architecture—S2#53, Jun. 26-30, 2006, 3GPP, Valbonne, France.

$1^{st}$ Office Action in corresponding Chinese Patent Application No. 200610115381.3 (Jun. 5, 2009).

$2^{nd}$ Office Action in corresponding Chinese Patent Application No. 200610115381.3 (Jan. 22, 2010).

$3^{rd}$ Office Action in corresponding Chinese Patent Application No. 200610115381.3 (May 27, 2010).

Extended European Search Report in corresponding European Patent Application No. 07785385.1 (Aug. 26, 2009).

Extended European Search Report in corresponding European Patent Application No. 11178390.8 (Oct. 20, 2011).

$1^{st}$ Office Action in corresponding European Patent Application No. 07785385.1 (Jan. 21, 2011).

$2^{nd}$ Office Action in corresponding European Patent Application No. 07785385.1 (May 16, 2011).

Notice of Allowance in corresponding Japanese Patent Application No. 2009-524069 (Jul. 5, 2011).

International Search Report in corresponding International Patent Application No. PCT/CN2007/070384 (Nov. 8, 2007).

Written Opinion of the International Searching Authority in corresponding International Patent Application No. PC/CN2007/070384 (Nov. 8, 2007).

$1^{st}$ Office Action in corresponding U.S. Appl. No. 13/216,028 (Jan. 17, 2012).

$1^{st}$ Office Action in corresponding U.S. Appl. No. 12/371,078 (Jan. 20, 2011).

$2^{nd}$ Office Action in corresponding U.S. Appl. No. 12/371,078 (Jun. 23, 2011).

U.S. Appl. No. 13/216,028 (Dec. 12, 2012).

U.S. Appl. No. 12/371,078 (Dec. 12, 2012).

First Office Action in corresponding Japanese Patent Application No. 2011-165390 (Dec. 11, 2012).

"3GPP TR 23.882—$3^{rd}$ Generation Partnership Project; Technical Specification Group Services and System Aspects; 3GPP System Architecture Evolution: Report on Technical Options and Conclusions (Release 7)," Jul. 2006, Version 1.3.0, $3^{rd}$ Generation Partnership Project, Valbonne, France.

3GPP TS 23.040 V6.7.0,3rd Generation Partnership Project;Technical Specification Group Core Network and Terminals;Technical realization of the Short Message Service (SMS)(Release 6), Mar. 2006, total 194 pages.

* cited by examiner

DATA PROCESSING METHOD AND SYSTEM

CROSS-REFERENCE TO RELATED APPLICATIONS

This application is a continuation of U.S. patent application Ser. No. 12/371,078, filed on Feb. 13, 2009, which is a continuation of International Patent Application No. PCT/CN2007/070384, filed on Jul. 30, 2007. The International Patent Application claims priority to Chinese Patent Application No. 200610115381.3, filed on Aug. 15, 2006. The aforementioned patent applications are hereby incorporated by reference in their entireties.

FIELD OF THE INVENTION

The present invention relates to the field of telecommunications and in particular to a data processing technique and system.

BACKGROUND OF THE INVENTION

Existing General Package Radio Service (GPRS)/Universal Mobile Telecommunications System (UMTS) techniques employ network architecture similar to second-generation wireless communication systems, including UMTS Territorial Radio Access Network (UTRAN), GSM/EDGE Radio Access Network (GERAN), Core Network (CN) and Mobile Station (MS), as illustrated in FIG. 1. The GERAN/UTRAN implements all wireless related functions, and the CN handles all voice calls and data connections in GPRS/UMTS and implements switching and routing functions with external networks.

Logically the CN can be divided into a Circuit Switched (CS) domain and a Packet Switched (PS) domain, supporting voice and data services respectively.

The CS domain includes nodes such as Mobile Switching Center (MSC) server, Media Gateway (MGW) and Gateway Mobile Switching Centre (GMSC) server. The MSC server transmits control plane data of the CS domain, and implements functions such as mobility management, call control and authentication encryption; the GMSC server handles call control and mobility control in the control plane for a GMSC; the MGW handles transmission of user plane data.

The PS domain includes nodes such as Serving GPRS Support Node (SGSN) and Gateway GPRS Support Node (GGSN). The GGSN is an interface to interact with external networks. Also, as a user plane anchor (i.e. user plane anchor network element) between a GERAN and a UTRAN, the GGSN transmits data of the user plane. Having a position similar to the MSC server in the CS domain, the SGSN implements functions such as routing forwarding, mobility management, session management and user information storage.

Home Location Registers (HLRs) are used in both the CS domain and the PS domain to store user subscription information.

In existing 3GPP protocols, user plane processing of UMTS is based on a two-tunnel mechanism illustrated as in FIG. 2. In UMTS, the user plane processing is between a Radio Network Controller (RNC, a network element of a UTRAN, used to control wireless resources of the UTRAN) and an SGSN, and between an SGSN and a GGSN, over an Iu interface and a Gn interface respectively. For the two-tunnel mechanism, an SGSN handles both the user plane and the control plane; therefore control plane processing and user plane processing are not separate.

With the introduction of High Speed Packet Access (HSPA) and IP Multimedia Subsystem (IMS), there will be a significant data flow growth in future 3GPP network. At present, in order to improve data processing capability of UMTS, a new UMTS user plane processing mechanism, i.e. direct-tunnel mechanism, has been proposed. As illustrated in FIG. 2, in this mechanism, the user plane processing of UMTS is between an RNC and a GGSN, without an SGSN. For the direct-tunnel mechanism, an SGSN handles functions of the control plane only; therefore control plane processing and user plane processing are separate.

Now with reference to FIGS. 3 to 6, the processes of handover or change between a GERAN and a UTRAN are illustrated hereinafter.

At present, the process of handing over from a GERAN to a UTRAN according to the protocol 43.129 is illustrated as in FIG. 3:

step S301: a source Base Station Subsystem (BSS) decides to initiate a PS handover;

step S302: the source BSS sends a PS handover request message to an old SGSN, i.e. 2G SGSN;

step S303: the 2G SGSN sends a forward relocation request message to a new SGSN, i.e. 3G SGSN;

step S304: the 3G SGSN builds a relocation request message and sends the message to a target RNC;

step S305: the target RNC sends a relocation request acknowledge message to the 3G SGSN;

step S306: the 3G SGSN sends a forward relocation response to the 2G SGSN;

step S307: the 2G SGSN receives an IP packet from a GGSN and sends the IP packet to an MS via the source BSS;

step S308: the 2G SGSN forwards the IP packet to the target RNC via the 3G SGSN;

step S309: the 2G SGSN sends a PS handover request acknowledge message to the source BSS;

step S310: the MS sends a handover to UTRAN complete message to the target RNC;

step S311: the target RNC sends a relocation complete message to the 3G SGSN;

step S312: the 3G SGSN sends an update PDP context request message to the GGSN;

step S313: the GGSN returns an update PDP context response message to the 3G SGSN;

The process of handing over from a UTRAN to a GERAN is illustrated as in FIG. 4:

step S401: a source RNC decides to initiate a PS handover;

step S402: the source RNC sends a relocation request message to an old SGSN, i.e. 3G SGSN;

step S403: the 3G SGSN sends a forward relocation request message to a new SGSN, i.e. 2G SGSN;

step S404: the 2G SGSN builds a PS handover request message and sends the message to a target BSS;

step S405: the target RNC sends a PS handover request acknowledge message to the 2G SGSN;

step S406: the 2G SGSN sends a forward relocation response message to the 3G SGSN;

step S407: the 3G SGSN receives an IP packet from a GGSN and sends the IP packet to an MS via the source RNC;

step S408: the 3G SGSN sends a relocation command message to the source RNC;

step S409: the source RNC forwards the IP packet to the 3G SGSN, the 3G SGSN forwards the IP packet to the 2G SGSN, and the 2G SGSN forwards the IP packet to the target BSS;

step S410: the target BSS sends a PS handover complete message to the 2G SGSN;

step S411: the 2G SGSN sends an update PDP context Request message to the GGSN;

step 412: the GGSN returns an update PDP context response message to the 2G SGSN;

At present, the process of changing from a GERAN to a UTRAN according to the protocol 23.060 is illustrated as in FIG. 5:

step S501: an MS decides to perform an inter-system change;

step S502: the MS sends a routing area update request message to a new SGSN, i.e. 3G SGSN;

step S503: the 3G SGSN sends an SGSN context request message to an old SGSN, i.e. 2G SGSN, to obtain user context;

step S504: the 2G SGSN returns an SGSN context response message to the 3G SGSN, and carries the user context information in the context response message;

step S505: the 3G SGSN sends an SGSN context acknowledge message to the 2G SGSN, informing the 2G SGSN that the 3G SGSN is ready to receive data packets;

step S506: the 2G SGSN duplicates a buffered data packet and forwards to the 3G SGSN;

step S507: the 3G SGSN sends an update PDP context request message to a GGSN;

step S508: the GGSN returns an update PDP context response to the 3G SGSN;

step S509: the 3G SGSN returns a routing area update accept message to the MS;

step S510: the MS returns a routing area update complete message to the 3G SGSN;

step S511: the MS sends a service request message to the 3G SGSN;

step S512: Radio Access Bearer (RAB) Assignment procedure is performed between the 3G SGSN and an RNC, thereby establishing a RAB;

At present, the process of changing from a UTRAN to a GERAN according to the protocol 23.060 is illustrated as in FIG. 6:

step S601: an MS decides to perform an inter-system change;

step S602: the MS sends a routing area update request message to a new SGSN, i.e. 2G SGSN;

step S603: the 2G SGSN sends an SGSN context request message to an old SGSN, i.e. 3G SGSN, to obtain user context;

step S604: the 3G SGSN sends an SRNS context request message to a source RNC;

step S605: the source RNC returns an SRNS context response message to the 3G SGSN, stops sending downlink data to the MS, and buffers the data;

step S606: the 3G SGSN returns an SGSN context response message to the 2G SGSN, and carries the user context information in the context response message;

step S607: the 2G SGSN sends an SGSN context acknowledge message to the 3G SGSN, informing the 3G SGSN that the 2G SGSN is ready to receive data packets;

step S608: the 3G SGSN sends an SRNS data forward command to the source RNC, the source RNC duplicates a buffered data packet and forwards to the 3G SGSN;

step S609: the 3G SGSN forwards the data packet to the 2G SGSN step S610: the 2G SGSN sends an update PDP context request message to a GGSN;

step S611: the GGSN returns an update PDP context response to the 2G SGSN;

step S612: the 2G SGSN returns a routing area update accept message to the MS;

step S613: the MS returns a routing area update complete message to the 2G SGSN;

In the processes as illustrated in FIGS. 3 to 6, the user plane data processing when a handover or change from a GERAN to a UTRAN takes place is that, a 3G SGSN forwards data that are forwarded to by a 2G 3GSN to a target RNC; and the user plane data processing when a handover or change from a UTRAN to a GERAN takes places is that, a 3G SGSN forwards data that is forwarded to by a source RNC to a 2G SGSN. However, in a direct-tunnel mechanism where a 3G SGSN no longer performs user plane data processing, data forwarding can not be done via a 3G SGSN. Therefore, the existing data processing method when a handover or change between a GERAN and a UTRAN takes place does not fit the direct-tunnel mechanism.

SUMMARY OF THE INVENTION

A data processing method and system are provided by the present invention, in order to implement data forwarding in a direct-tunnel mechanism when a handover or change between a 2G system and a 3G system takes place.

The present invention provides a data processing method. The method includes: receiving, by a user plane anchor network element, data forwarded by a source data forwarding network element; and forwarding, by the user plane anchor network element, the data to a target side processing network element.

The present invention further provides a data processing method. The method includes: receiving, by a user plane anchor network element, an instructive message, and sending data to at least one of a source data forwarding network element and a target side processing network element; and updating, by the user plane anchor network element, user plane routing, and sending the data to the target side processing network element as instructed in the message according to the updated user plane routing.

The present invention provides a data processing system, including a source data forwarding network element, a user plane anchor network element and a target side processing network element, wherein the user plane anchor network element is provided with a receipt unit adapted to receive data forwarded by the source data forwarding network element, and a sending unit adapted to forward the received data to the target side processing network element.

The present invention provides a user plan anchor network element, including a receipt unit and a sending unit, wherein the receipt unit is adapted to receive data forwarded by the source data forwarding network element; and the sending unit is adapted to forward the received data to the target side processing network element.

With the data processing methods in the direct-tunnel mechanism when a handover or change between a GERAN and a UTRAN takes place, a GGSN can buffer data forwarded by a source data forwarding network element and then send the data to a target side processing network element; alternatively, the GGSN can send the data forwarded by the source data forwarding network element directly to the target side processing network element. The problem that the data processing method in the conventional art is not applicable in the direct-tunnel mechanism is solved and normal forwarding of service data in the direct-tunnel mechanism when a handover or change between a GERAN and a UTRAN takes place is achieved.

DETAILED DESCRIPTION OF THE EMBODIMENTS

Exemplary embodiments of the present invention will be described in details hereinafter with reference to the drawings.

In the specification multiple embodiments of data processing method are provided. A first method is described hereinafter. The method includes: when a change or handover from a GERAN to a UTRAN takes place, a 2G SGSN forwards a data packet to a GGSN, and the GGSN forwards the data packet to a target RNC; when a handover from a UTRAN to a GERAN takes place, a source RNC forwards a data packet to a GGSN, the GGSN forwards the data packet to a 2G SGSN, and the 2G SGSN forwards the data packet to a target BSS.

Figure 1:
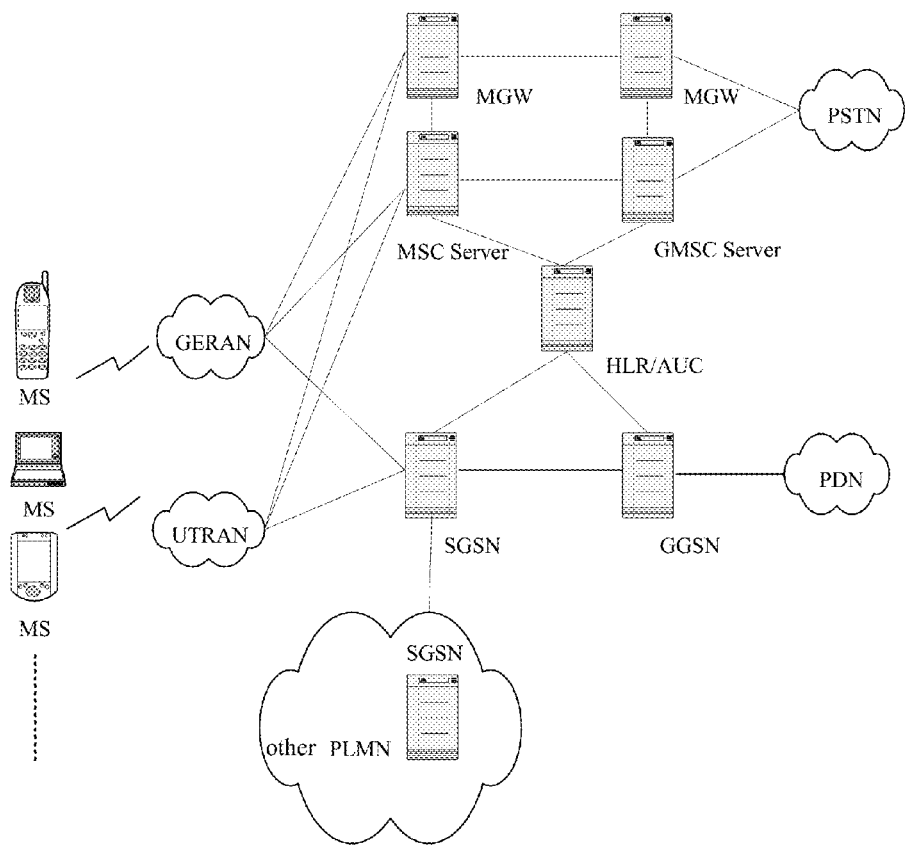
FIG. 1 illustrates network architecture of GPRS/ UMTS.
Figure 2:
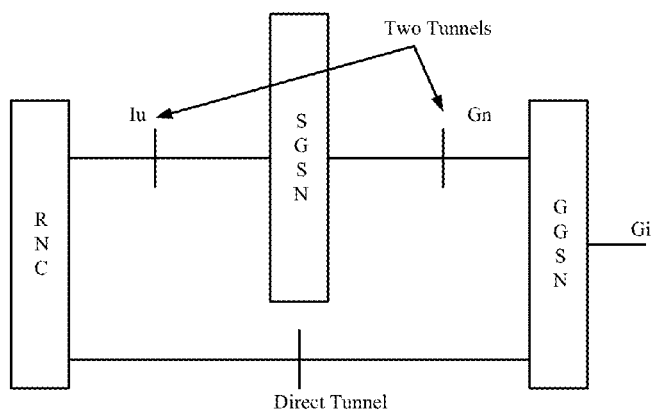
FIG. 2 illustrates user plane processing in the conventional art.
Figure 3:
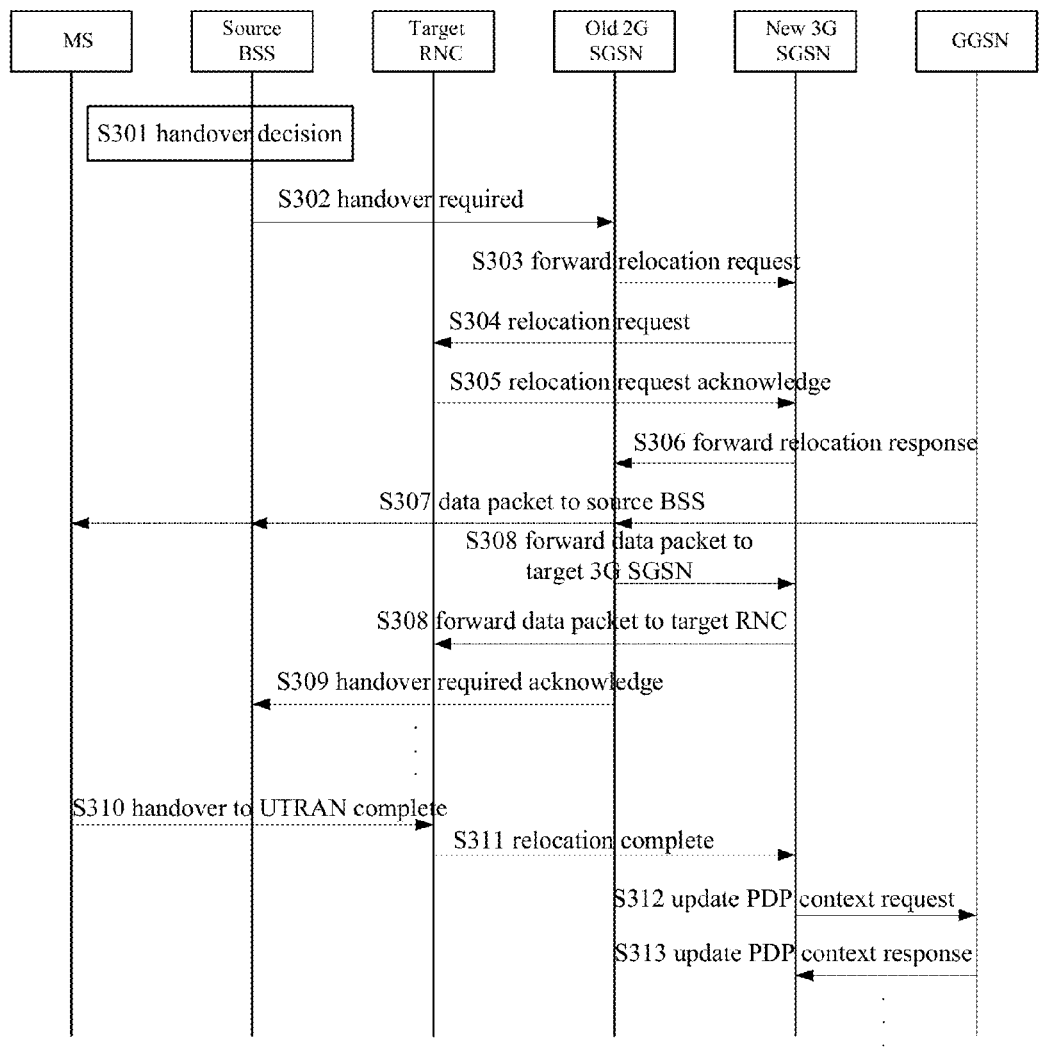
FIG. 3 is a flow chart of a data processing method when a handover from a GERAN to a UTRAN takes place according to the protocol 43.129.
Figure 4:
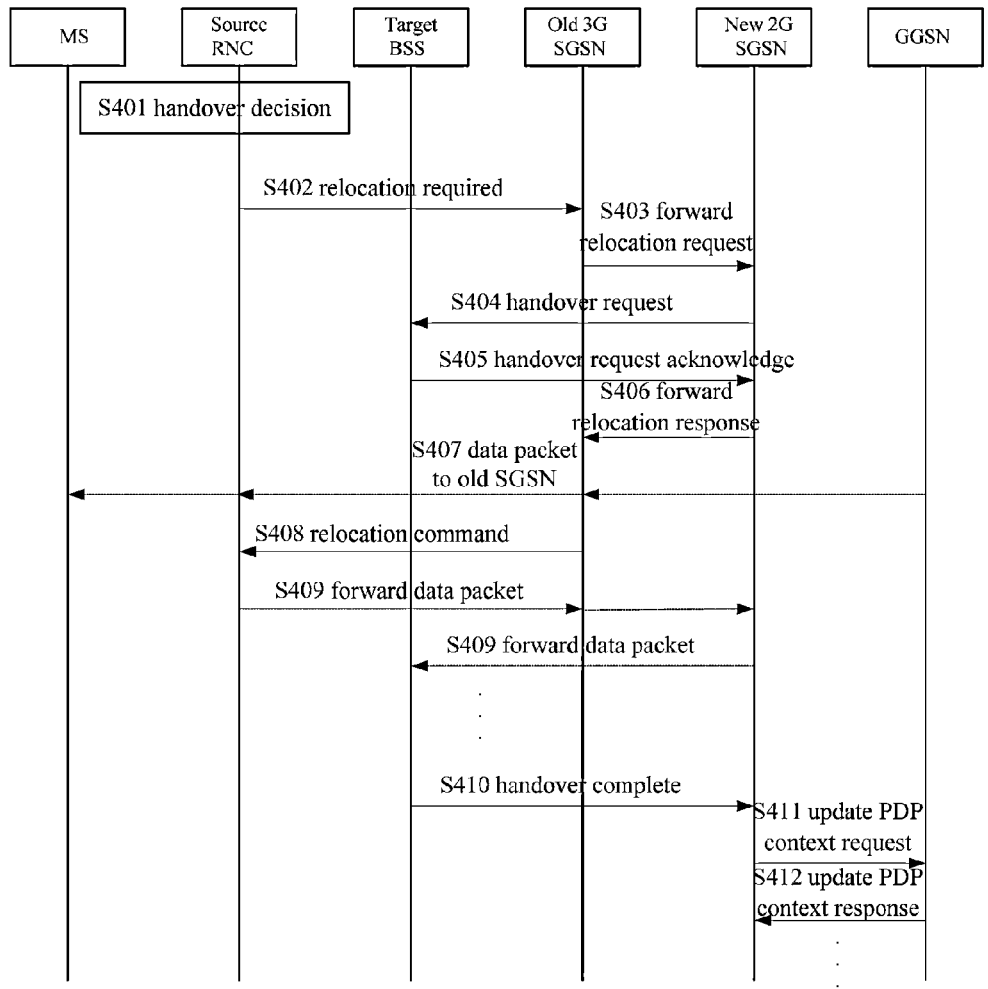
FIG. 4 is a flow chart of a data processing method when a handover from a UTRAN to a GERAN takes place according to the protocol 43.129.
Figure 5:
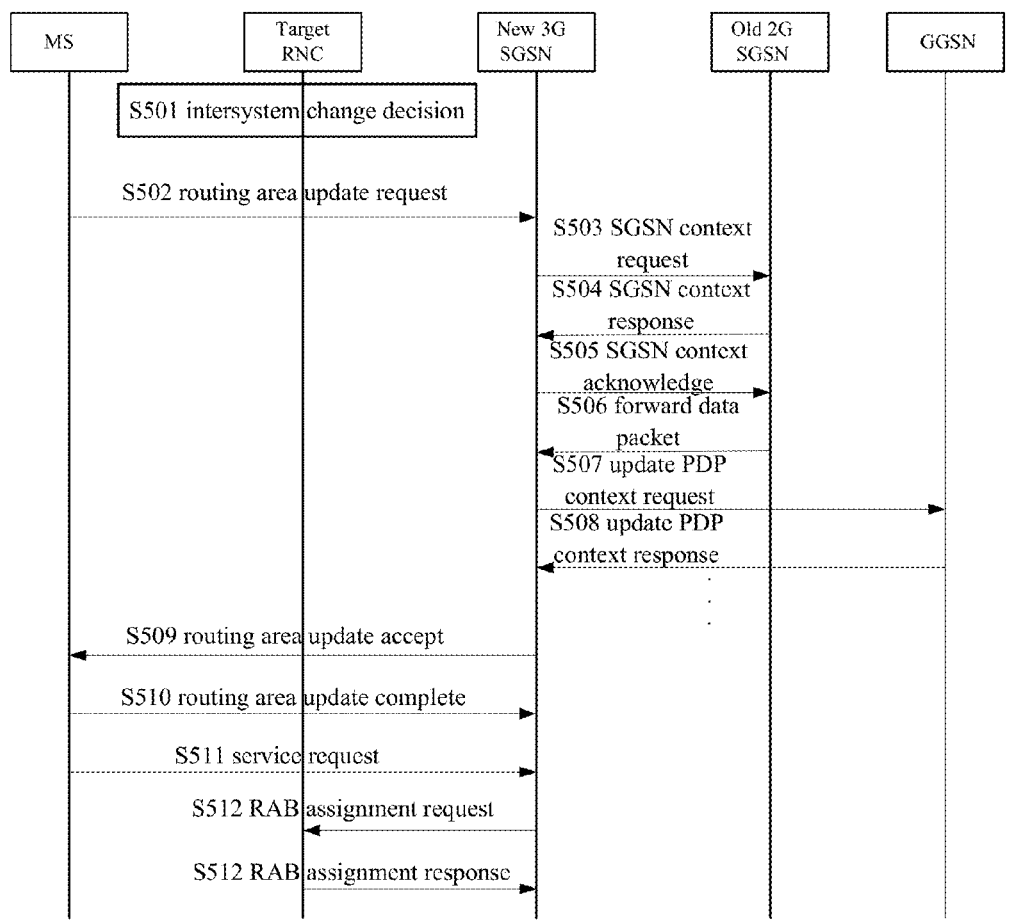
FIG. 5 is a flow chart of a data processing method when a change from a GERAN to a UTRAN takes place according to the protocol 23.060.
Figure 6:
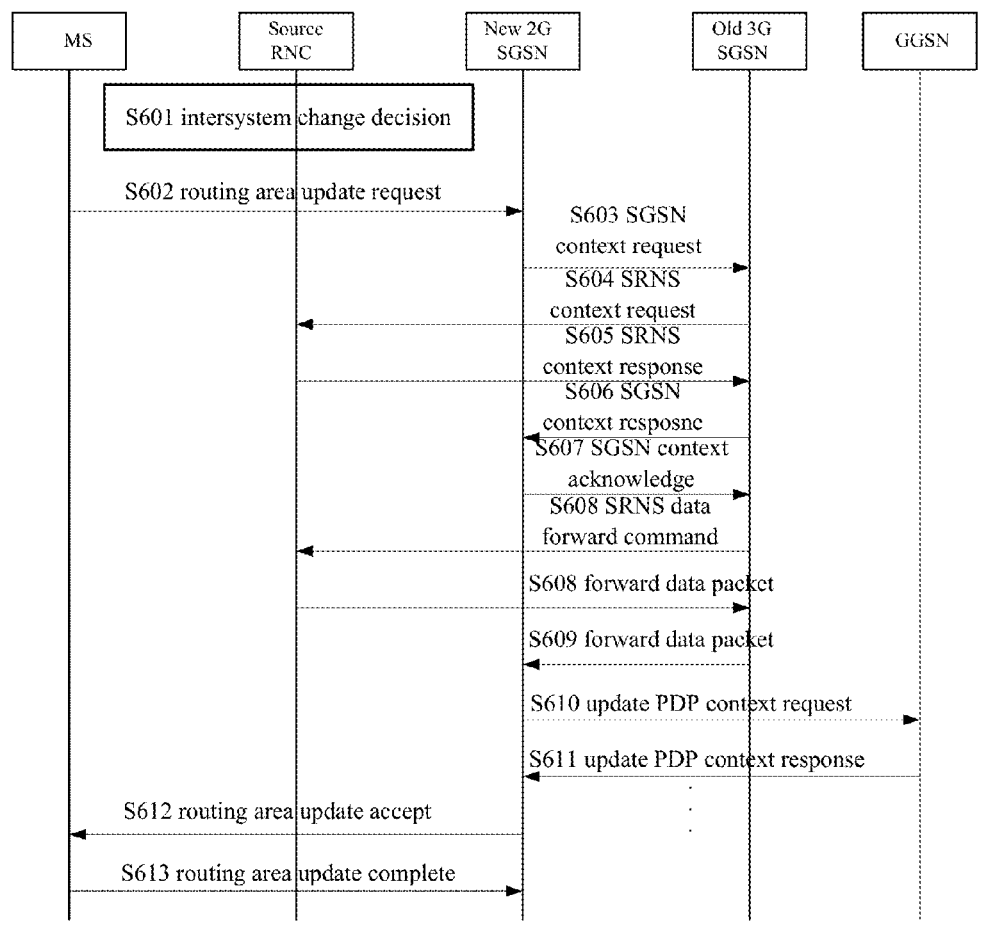
FIG. 6 is a flow chart of a data processing method when a change from a UTRAN to a GERAN takes place according to the protocol 23.060.
Figure 7:
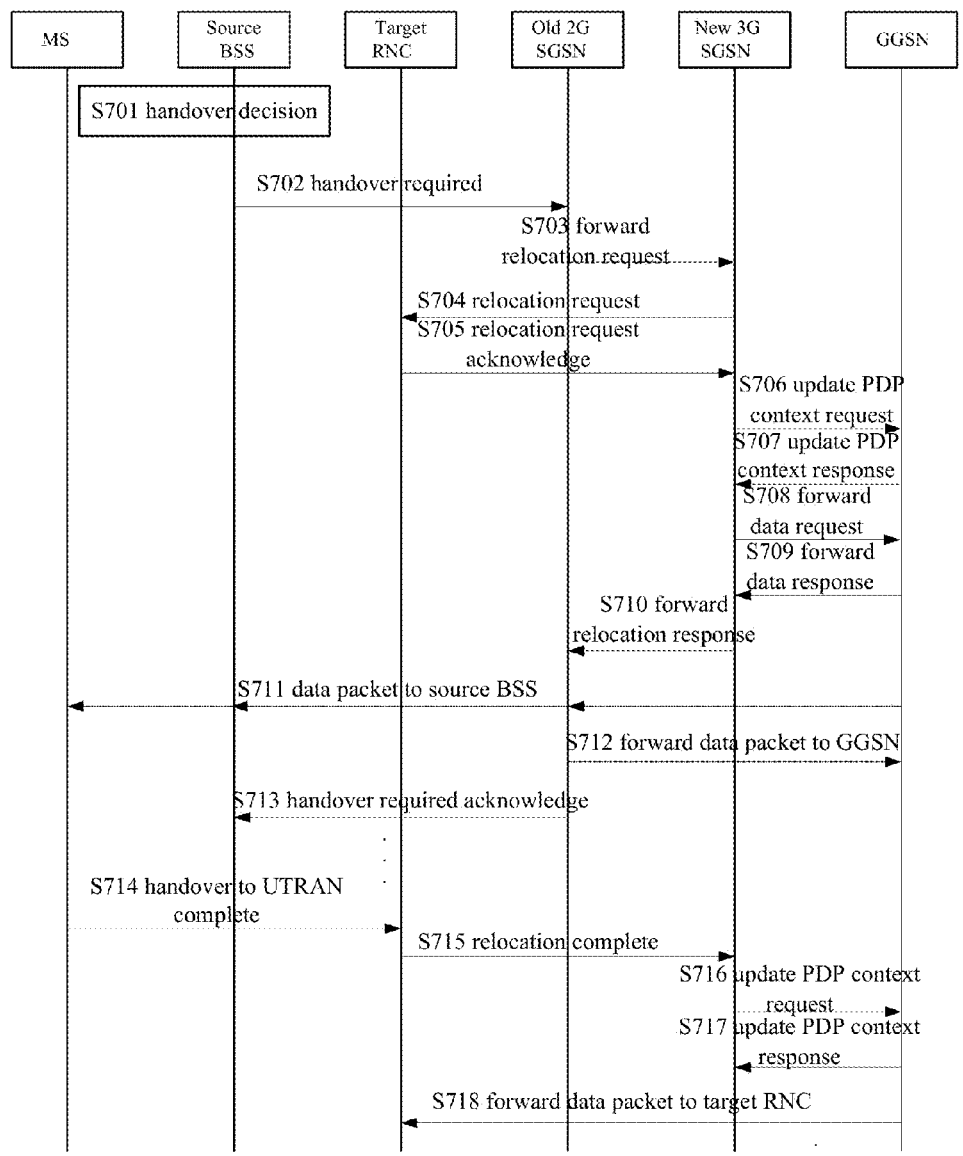
FIG. 7 is a flow chart of a data processing method when a handover from a GERAN to a UTRAN takes place according to a first embodiment of the present invention.

Now refer to FIG. 7.

As illustrated in FIG. 7, a data processing method when a handover from a GERAN to a UTRAN takes place includes:

step S701: a source BSS decides to initiate a handover;

step S702: the source BSS sends a handover request message to an old SGSN, i.e. 2G SGSN;

step S703: the 2G SGSN sends a forward relocation request message to a new SGSN, i.e. 3G SGSN;

step S704: the 3G SGSN builds a relocation request message, and sends the message to a target RNC;

step S705: the target RNC sends a relocation request acknowledged message to the 3G SGSN;

step S706: the 3G SGSN sends an update PDP context request message to a GGSN, to request to change user plane routing from the GGSN to the 3G SGSN;

step S707: the GGSN returns an update PDP context response to the 3G SGSN;

step S708: the 3G SGSN sends a forward data request to the GGSN, to request the GGSN to assign a data forwarding tunnel for data forwarding;

step S709: the GGSN returns a forward data response message to the 3G SGSN, assigns a data forwarding tunnel identifier to the data forwarding tunnel and carries the data forwarding tunnel identifier in the response message to the 3G SGSN, the data forwarding tunnel identifier includes IP address and TEID (Tunnel End Point Identifier);

step S710: the 3G SGSN sends a forward relocation response message to the 2G SGSN, a data forwarding tunnel identifier carried in the message is the data forwarding tunnel identifier of the GGSN;

step S711: the 2G SGSN receives a data packet from the GGSN, and sends the data packet to an MS via the source BSS;

step S712: for data of a lossless service, the 2G SGSN forwards the data packet to the GGSN according to the data forwarding tunnel identifier carried in the forward relocation response message sent by the 3G SGSN, the GGSN buffers the data packet after receiving the data packet forwarded by the 2G SGSN;

step S713: the 2G SGSN sends a handover request acknowledge message to the source BSS;

step S714: the MS sends a handover to UTRAN complete message to the target RNC;

step S715: the target RNC sends a relocation complete message to the 3G SGSN;

step S716: the 3G SGSN sends an update context request message to the GGSN;

step S717: the GGSN returns an update context response message to the 3G SGSN;

step S718: the GGSN forwards the buffered forwarded data packet to the target RNC.

Figure 8:
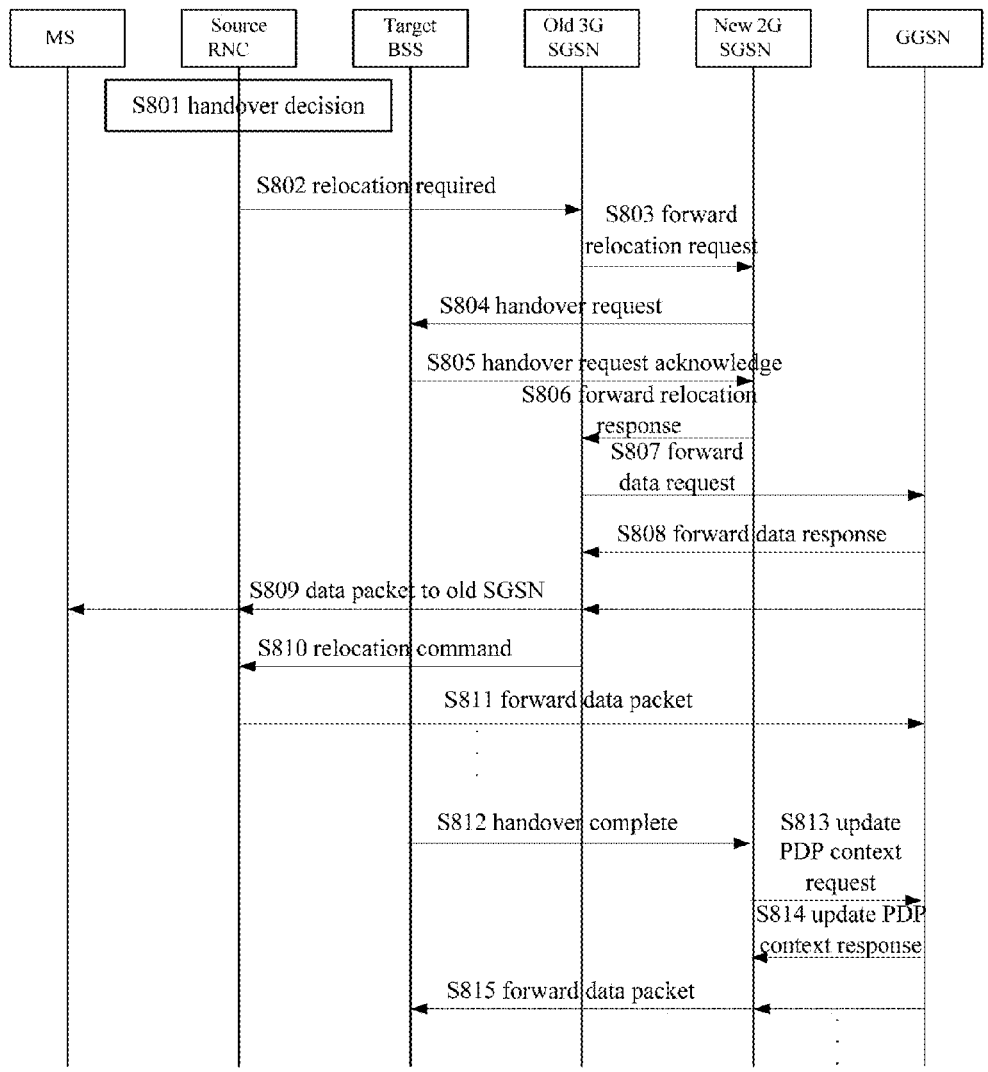
FIG. 8 is a flow chart of a data processing method when a handover from a UTRAN to a GERAN takes place according to a first embodiment of the present invention.

Now with reference to FIG. 8, a data processing method when a handover from a UTRAN to a GERAN takes place includes:

step S801: a source RNC decides to initiate a handover;

step S802: the source RNC sends a relocation request message to an old SGSN, i.e. 3G SGSN;

step S803: the 3G SGSN sends a forward relocation request message to a new SGSN, i.e. 2G SGSN;

step S804: the 2G SGSN builds a handover request message, and sends the message to a target BSS;

step S805: the target BSS sends a handover request acknowledged message to the 2G SGSN;

step S806: the 2G SGSN sends a forward relocation response message to the 3G SGSN;

step S807: the 3G SGSN sends a forward data request to a GGSN, to request the GGSN to assign a data forwarding tunnel for data forwarding;

step S808: the GGSN returns a forward data response message to the 3G SGSN, assigns a data forwarding tunnel identifier to the data forwarding tunnel and carries the data forwarding tunnel identifier in the response message to the 3G SGSN;

step S809: the 3G SGSN receives a data packet from the GGSN, and sends the data packet to an MS via the source RNC;

step S810: the 3G SGSN sends a relocation command message to the source RNC, a data forwarding tunnel identifier carried in the message is the data forwarding tunnel identifier of the GGSN;

step S811: for data of a lossless service, the source RNC forwards the data packet to the GGSN according to the data forwarding tunnel identifier carried in the relocation command message sent by the 3G SGSN, the GGSN buffers the received data packet;

step S812: the target BSS sends a handover complete message to the 2G SGSN;

step S813: the 2G SGSN sends an update context request message to the GGSN;

step S814: the GGSN returns an update context response message to the 2G SGSN;

step S815: the GGSN forwards the buffered forwarded data packet to the 2G SGSN.

Figure 9:
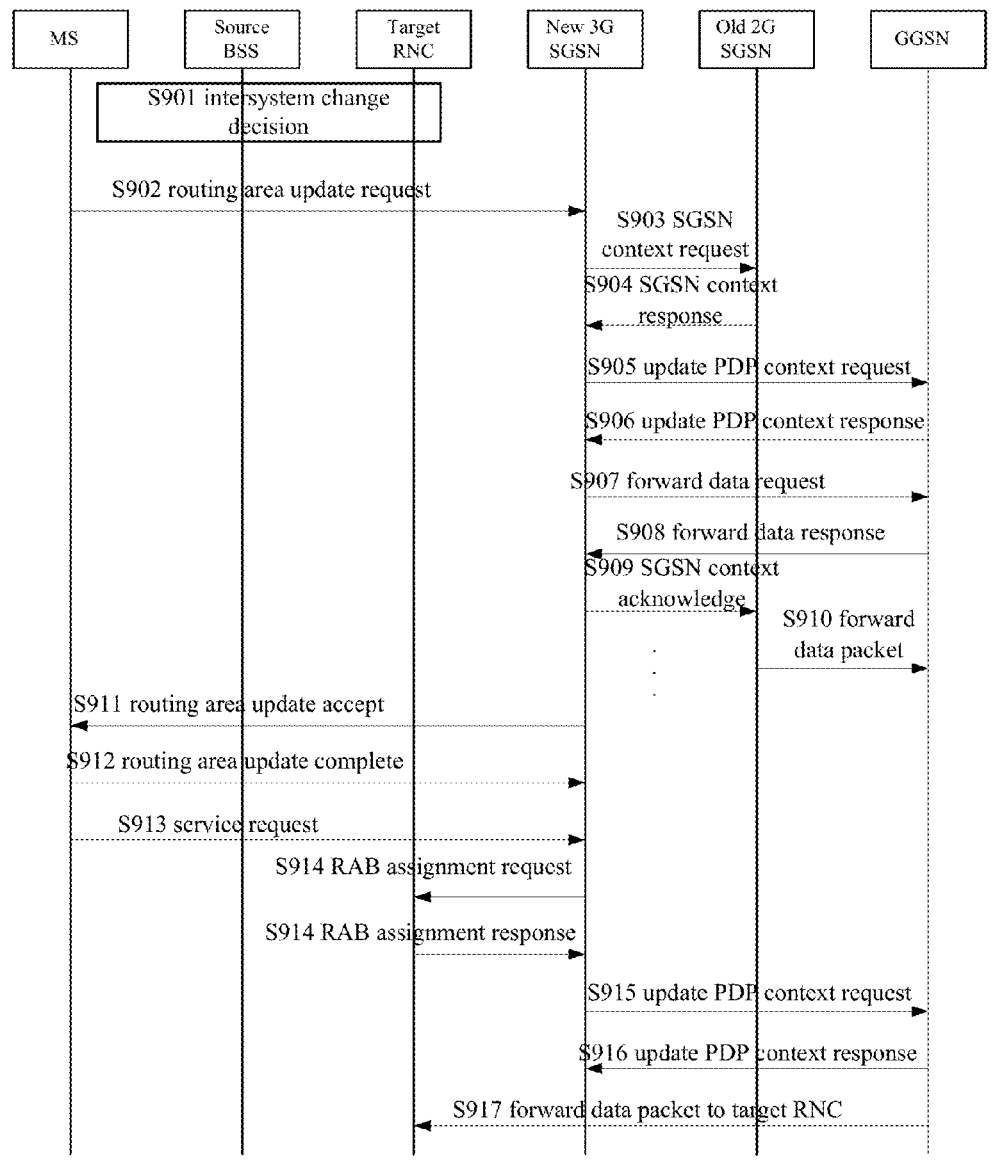
FIG. 9 is a flow chart of a data processing method when a change from a GERAN to a UTRAN takes place according to a first embodiment of the present invention.

Now with reference to FIG. 9, a data processing method when a change from a GERAN to a UTRAN takes place includes:

step S901: an MS decides to initiate an intersystem change;

step S902: the MS sends a routing area update request message to a new SGSN, i.e. 3G SGSN;

step S903: the 3G SGSN sends an SGSN context request message to an old SGSN, i.e. 2G SGSN, to obtain user context;

step S904: the 2G SGSN returns an SGSN context response message to the 3G SGSN, and carries the user context information in the message;

step S905: the 3G SGSN sends an update PDP context request message to a GGSN, to request to change user plane routing from the GGSN to the 3G SGSN;

step S906: the GGSN returns an update PDP context response message to the 3G SGSN;

step S907: the 3G SGSN sends a forward data request message to the GGSN, to request the GGSN to assign a data forwarding tunnel for data forwarding; step S908: the GGSN returns a forward data response message to the 3G SGSN, assigns a data forwarding tunnel identifier to the data forwarding tunnel, and carries the data forwarding tunnel identifier in the response message to the 3G SGSN;

step S909: the 3G SGSN sends an SGSN context acknowledge message to the 2G SGSN, informing the 2G SGSN that the 3G SGSN is ready to receive data packets, a data forwarding tunnel identifier carried in the message is the data forwarding tunnel identifier of the GGSN;

step S910: the 2G SGSN duplicates a buffered data packet and forwards to the GGSN according to the data forwarding tunnel identifier carried in the SGSN context acknowledge message sent by the 3G SGSN, the GGSN buffers the received forwarded data packet;

step S911: the 3G SGSN returns a routing area update accept message to the MS;

step S912: the MS returns a routing area update complete message to the 3G SGSN;

step S913: the MS returns a service request message to the 3G SGSN;

step S914: RAB assignment procedure is performed between the 3G SGSN and an RNC, thereby establishing RAB;

step S915: the 3G SGSN sends an update context request message to the GGSN;

step S916: the GGSN returns an update context response message to the 3G SGSN;

step S917: the GGSN forwards the buffered forwarded data packet to the target RNC.

Figure 10:
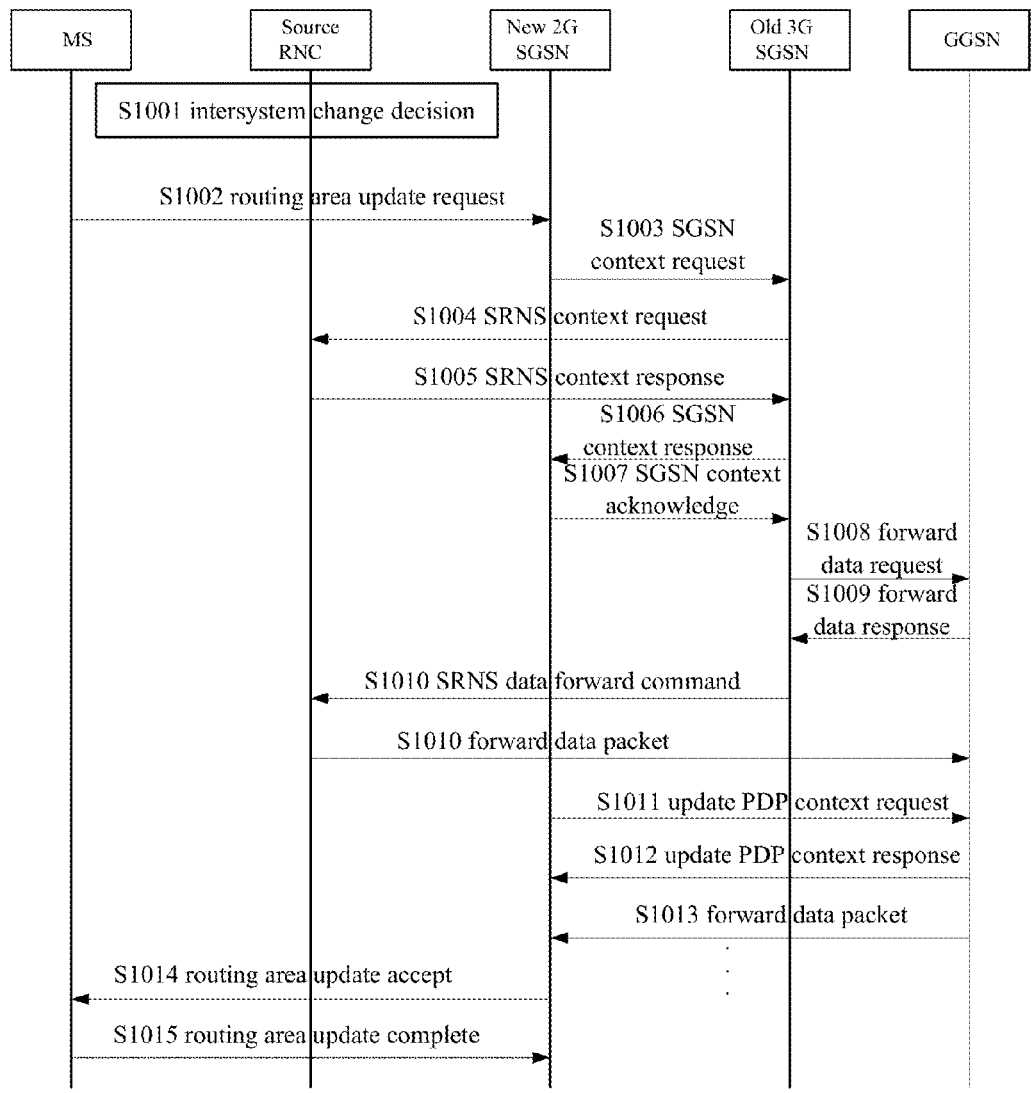
FIG. 10 is a flow chart of a data processing method when a change from a UTRAN to a GERAN takes place according to a first embodiment of the present invention.

Now with reference to FIG. 10, a data processing method when a change from a UTRAN to a GERAN takes place includes:

step S1001: an MS decides to initiate an intersystem change;

step S1002: the MS sends a routing area update request message to a new SGSN, i.e. 2G SGSN;

step S1003: the 2G SGSN sends an SGSN context request message to an old SGSN, i.e. 3G SGSN, to obtain user context;

step S1004: the 3G SGSN sends an SRNS context request message to a source RNC;

step S1005: the source RNC returns an SRNS context response message to the 3G SGSN, stops sending downlink data to the MS, and buffers the data;

step S1006: the 3G SGSN returns an SGSN context response message to the 2G SGSN, and carries the user context information in the message;

step S1007: the 2G SGSN sends an SGSN context acknowledge message to the 3G SGSN, informing the 3G SGSN that the 2G SGSN is ready to receive data packets;

step S1008: the 3G SGSN sends a forward data request to a GGSN, to request the GGSN to assign a data forwarding tunnel for data forwarding;

step S1009: the GGSN returns a forward data response message to the 3G SGSN, assigns a data forwarding tunnel identifier to the data forwarding tunnel, and carries the data forwarding tunnel identifier in the response message to the 3G SGSN;

step S1010: the 3G SGSN sends an SRNS data forward command to the source RNC, a data forwarding tunnel identifier carried in the message is the data forwarding tunnel identifier of the GGSN, the source RNC duplicates a buffered data packet and forwards to the GGSN, the GGSN buffers the forwarded data packet;

step S1011: the 2G SGSN sends an update PDP context request message to the GGSN;

step S1012: the GGSN returns an update PDP context response message to the 2G SGSN;

step S1013: the GGSN forwards the buffered forwarded data packet to the 2G SGSN;

step S1014: the 2G SGSN returns a routing area update accept message to the MS;

step S1015: the MS returns a routing area update complete message to the 2G SGSN.

Figure 11:
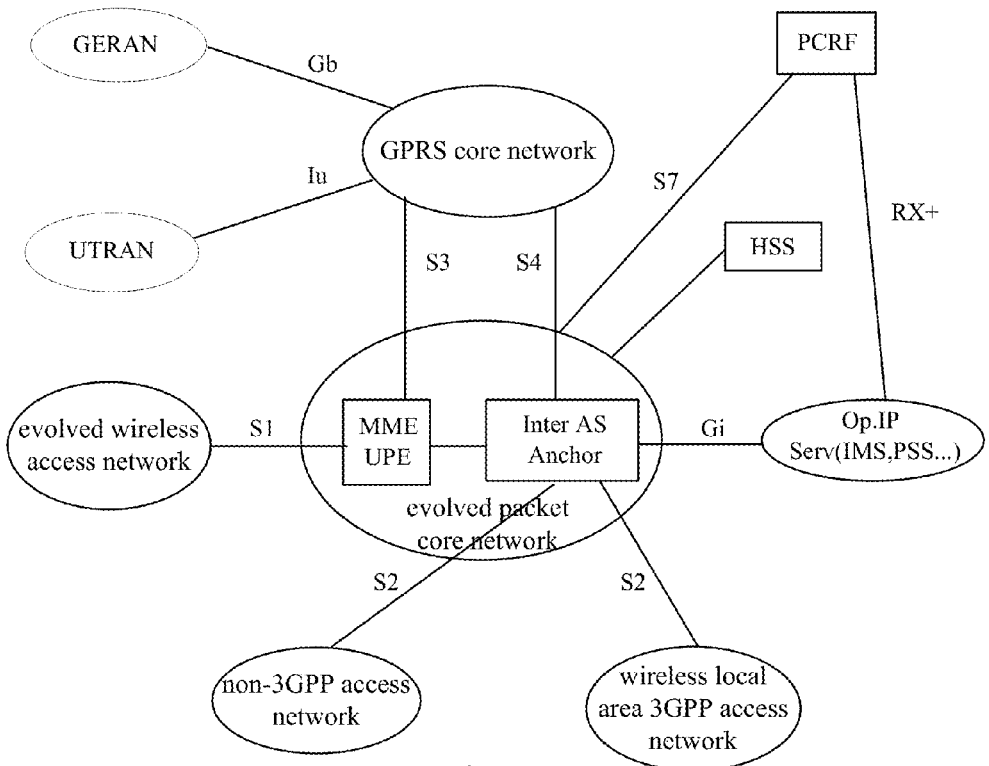
FIG. 11 illustrates network architecture of an evolved packet core network in the conventional art.

In order to enhance its competitive advantages in the future, the 3GPP is studying new evolved network architecture, including System Architecture Evolution (SAE) and Long Term Evolution (LTE) access network. The evolved access network is known as E-UTRAN, network architecture of an evolved packet core network, illustrated as in FIG. 11, includes a Mobility Management Entity (MME), a User Plane Entity (UPE), and an Inter Access System Anchor (IASA). The MME performs mobility management in the control plane, including user context and mobility status management, user temporary identity identifier assignment and so forth, corresponding to the control plane of an SGSN inside GPRS/UMTS; the UPE is used to initiate paging for downlink data in idle state, manages and stores IP bearer parameters and routing information inside the network and so forth, corresponding to the data plane of an SGSN and a GGSN in GPRS/UMTS; the IASA is an anchor in the user plane between different systems. A Policy and Charging Rule Function (PCRF) entity is used for policy control decision and charging control of data flow. A Home Subscriber Server (HSS) is used to store user subscription information.

For the SAE system, if the MME and the UPE are separate, and the UPE and the 3GPP Anchor are in a same entity, the systematic architecture is similar to the architecture in the direct-tunnel mechanism where the MME corresponds to an SGSN, and the UPE/3GPP Anchor (referred to as UPE hereinafter) corresponds to a GGSN. Therefore the data forwarding processing method stated above can be used for data forwarding when a handover or change between a GERAN/UTRAN system and an SAE system takes place.

When a handover or change from a GERAN system to an SAE system takes place, the MME and the UPE (user plane anchor of the GERAN/UTRAN and the SAE) exchange messages including a forward data request message and a forward data response message, to obtain a data forwarding tunnel identifier of the UPE, and inform the 2G SGSN of the data forwarding tunnel identifier of the UPE. The 2G SGSN forwards a data packet to the UPE; the UPE buffers the forwarded data packet and forwards the buffered forwarded data packet to the evolved access network on completion of update of user plane routing.

When a handover or change from an SAE system to a GERAN system takes place, the MME and the UPE exchange messages including a forward data request message and a forward data response message, to obtain a data forwarding tunnel identifier of the UPE, and inform the evolved access network of the data forwarding tunnel identifier of the UPE. The evolved access network forwards a data packet to the UPE; the UPE buffers the forwarded data packet and forwards the buffered forwarded data packet to the 2G SGSN on completion of update of user plane routing.

When a handover or change from a UTRAN system to an SAE system takes place, the 3G SGSN and the UPE exchange messages including a forward data request message and a forward data response message, to obtain a data forwarding tunnel identifier of the UPE, and inform the source RNC of the data forwarding tunnel identifier of the UPE. The source RNC forwards a data packet to the UPE; the UPE buffers the forwarded data packet and forwards the buffered forwarded data packet to the evolved access network on completion of update of user plane routing.

When a handover or change from an SAE system to a UTRAN system takes place, the MME and the UPE exchange messages including a forward data request message and a forward data response message, to obtain a data forwarding tunnel identifier of the UPE, and inform the evolved access network of the data forwarding tunnel identifier of the UPE. The evolved access network forwards a data packet to the UPE; the UPE buffers the forwarded data packet and forwards the buffered forwarded data packet to the target RNC on completion of update of user plane routing.

Now refer to FIGS. 12 to 15. Another data processing method embodiment provided by the present invention is described.

Figure 12:
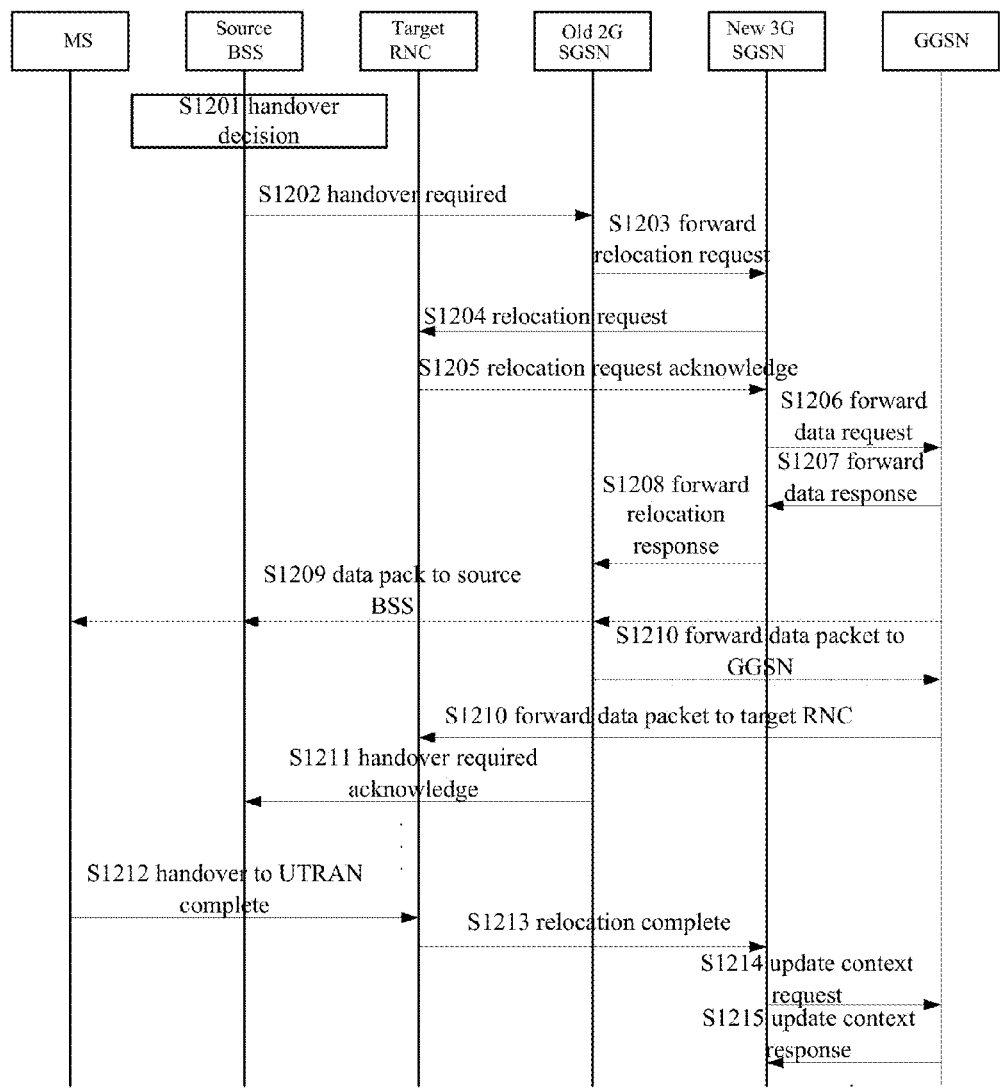
FIG. 12 is a flow chart of a data processing method when a handover from a GERAN to a UTRAN takes place according to a second embodiment of the present invention.

With reference to FIG. 12, a data processing method when a handover from a GERAN to a UTRAN takes place includes:

step 1201: a source BSS decides to initiate a handover;

step 1202: the source BSS sends a handover request message to an old SGSN, i.e. 2G SGSN;

step 1203: the 2G SGSN sends a forward relocation request message to a new SGSN, i.e. 3G SGSN;

step 1204: the 3G SGSN builds a relocation request message and sends the message to a target RNC;

step 1205: the target RNC sends relocation request acknowledge message to the 3G SGSN;

step 1206: the 3G SGSN sends a forward data request message to a GGSN, to request the GGSN to assign a data forwarding tunnel for data forwarding, an identifier of a GTP tunnel of the target RNC side is carried in the message, subsequently the GGSN will forward data of a lossless service to the GTP tunnel;

step 1207: the GGSN returns a forward data response message to the 3G SGSN, assigns a data forwarding tunnel identifier to the data forwarding tunnel, and sends to the 3G SGSN in the response message;

step 1208: the 3G SGSN sends a forward relocation response message to the 2G SGSN, a data forwarding tunnel identifier carried in the message is the data forwarding tunnel identifier of the GGSN;

step 1209: the 2G SGSN receives a data packet from the GGSN, and sends the data packet to an MS via the source BSS;

step 1210: for data of a lossless service, the 2G SGSN forwards the data packet to the GGSN according to the data forwarding tunnel identifier carried in the forward relocation response message sent by the 3G SGSN, the GGSN forwards the data packet forwarded by the 2G SGSN to the target RNC on receipt of the data packet;

step 1211: the 2G SGSN sends a handover request acknowledge message to the source BSS;

step S1212: the MS sends a handover to UTRAN complete message to the target RNC;

step S1213: the target RNC sends a relocation complete message to the 3G SGSN;

step S1214: the 3G SGSN sends an update context request message to the GGSN;

step S1215: the GGSN returns an update context response message to the 3G SGSN.

Figure 13:
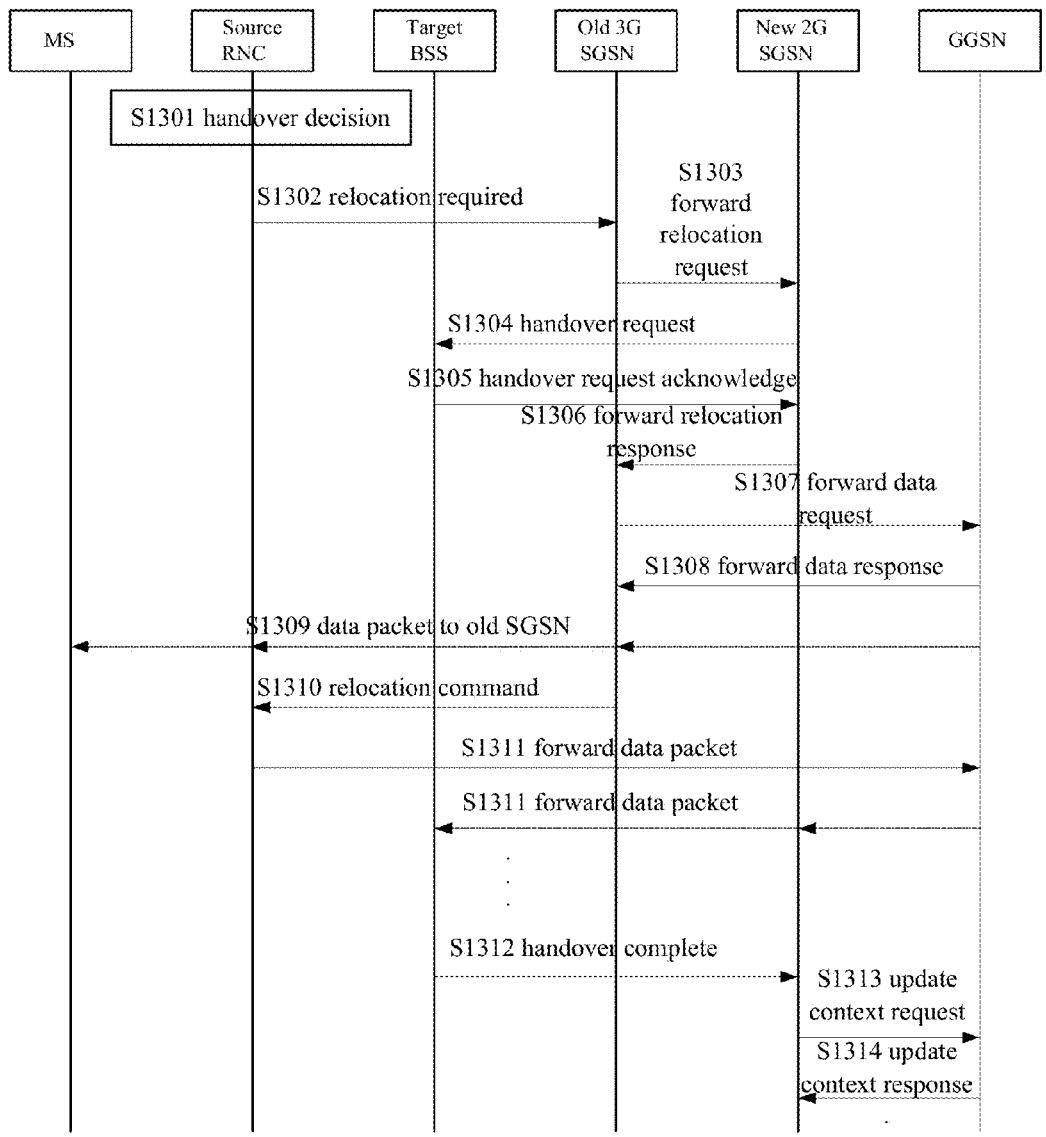
FIG. 13 is a flow chart of a data processing method when a handover from a UTRAN to a GERAN takes place according to a second embodiment of the present invention.

With reference to FIG. 13, a data processing method when a handover from a UTRAN to a GERAN takes place includes:

step S1301: a source RNC decides to initiate a handover;

step S1302: the source RNC sends a relocation request message to an old SGSN, i.e. 3G SGSN;

step S1303: the 3G SGSN sends a forward relocation request message to a new SGSN, i.e. 2G SGSN;

step S1304: the 2G SGSN builds a handover request message, and sends the message to a target BSS;

step S1305: the target BSS sends a handover request acknowledged message to the 2G SGSN;

step S1306: the 2G SGSN sends a forward relocation response message to the 3G SGSN;

step S1307: the 3G SGSN sends a forward data request to a GGSN, to request the GGSN to assign a data forwarding tunnel for data forwarding, an identifier of a data forwarding tunnel of the 2G SGSN is carried in the message, subsequently the GGSN will forward data of a lossless service to the data forwarding tunnel;

step S1308: the GGSN returns a forward data response message to the 3G SGSN, assigns a data forwarding tunnel identifier to the data forwarding tunnel and carries the data forwarding tunnel identifier in the response message to the 3G SGSN;

step S1309: the 3G SGSN receives a data packet from the GGSN, and sends the data packet to an MS via the source RNC;

step S1310: the 3G SGSN sends a relocation command message to the source RNC, a data forwarding tunnel identifier carried in the message is the data forwarding tunnel identifier of the GGSN;

step S1311: for data of a lossless service, the source RNC forwards the data packet to the GGSN according to the data forwarding tunnel identifier carried in the relocation command message sent by the 3G SGSN, the GGSN forwards the data packet forwarded by the source RNC to the 2G SGSN on receipt of the data packet, the 2G SGSN forwards the data packet to the target BSS;

step S1312: the target BSS sends a handover complete message to the 2G SGSN;

step S1313: the 2G SGSN sends an update context request message to the GGSN;

step S1314: the GGSN returns an update context response message to the 2G SGSN.

Figure 14:
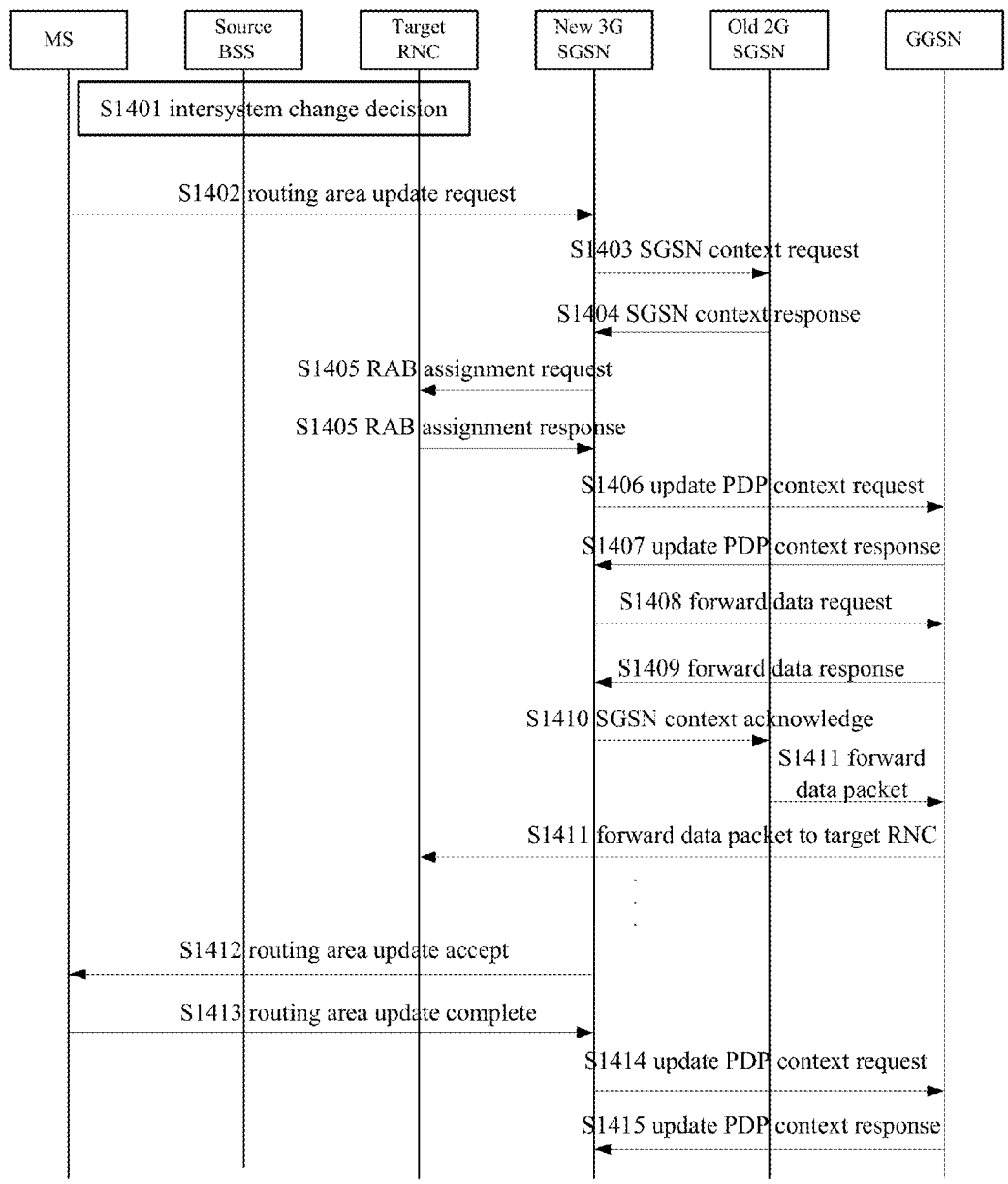
FIG. 14 is a flow chart of a data processing method when a change from a GERAN to a UTRAN takes place according to a second embodiment of the present invention.

With reference to FIG. 14, a data processing method when a change from a GERAN to a UTRAN takes place includes.

step S1401: an MS decides to initiate an intersystem change;

step S1402: the MS sends a routing area update request message to a new SGSN, i.e. 3G SGSN;

step S1403: the 3G SGSN sends an SGSN context request message to an old SGSN, i.e. 2G SGSN, to obtain user context;

step S1404: the 2G SGSN returns SGSN context response message to the 3G SGSN, and carries the user context information in the message;

step 1405: RAB assignment procedure is performed between the 3G SGSN and an RNC, thereby establishing RAB;

step S1406: the 3G SGSN sends an update PDP context request message to a GGSN, to request to change user plane routing from the GGSN to the 3G SGSN;

step S1407: the GGSN returns an update PDP context response to the 3G SGSN;

step S1408: the 3G SGSN sends a forward data request message to the GGSN, to request the GGSN to assign a data forwarding tunnel for data forwarding, an identifier of a GTP tunnel of the target RNC side is carried in the message, subsequently the GGSN will forward data of a lossless service to the GTP tunnel;

step S1409: the GGSN returns a forward data response message to the 3G SGSN, assigns a data forwarding tunnel identifier to the data forwarding tunnel, and carries the data forwarding tunnel identifier in the response message to the 3G SGSN;

step S1410: the 3G SGSN sends an SGSN context acknowledge message to the 2G SGSN, informing the 2G SGSN that the 3G SGSN is ready to receive data packets, a data forwarding tunnel identifier carried in the message is the data forwarding tunnel identifier of the GGSN;

step S1411: the 2G SGSN duplicates a buffered data packet and forwards to the GGSN according to the data forwarding tunnel identifier carried in the SGSN context acknowledge message sent by the 3G SGSN, the GGSN forwards the data packet forwarded by the 2G SGSN to the target RNC on receipt of the data packet;

step S1412: the 3G SGSN returns a routing area update accept message to the MS;

step S1413: the MS returns a routing area update complete message to the 3G SGSN;

step S1414: the 3G SGSN sends an update context request message to the GGSN, to change a downlink GTP tunnel identifier of user context in the GGSN to the GTP tunnel identifier of the RNC;

step S1415: the GGSN returns an update context response message to the 3G SGSN.

Figure 15:
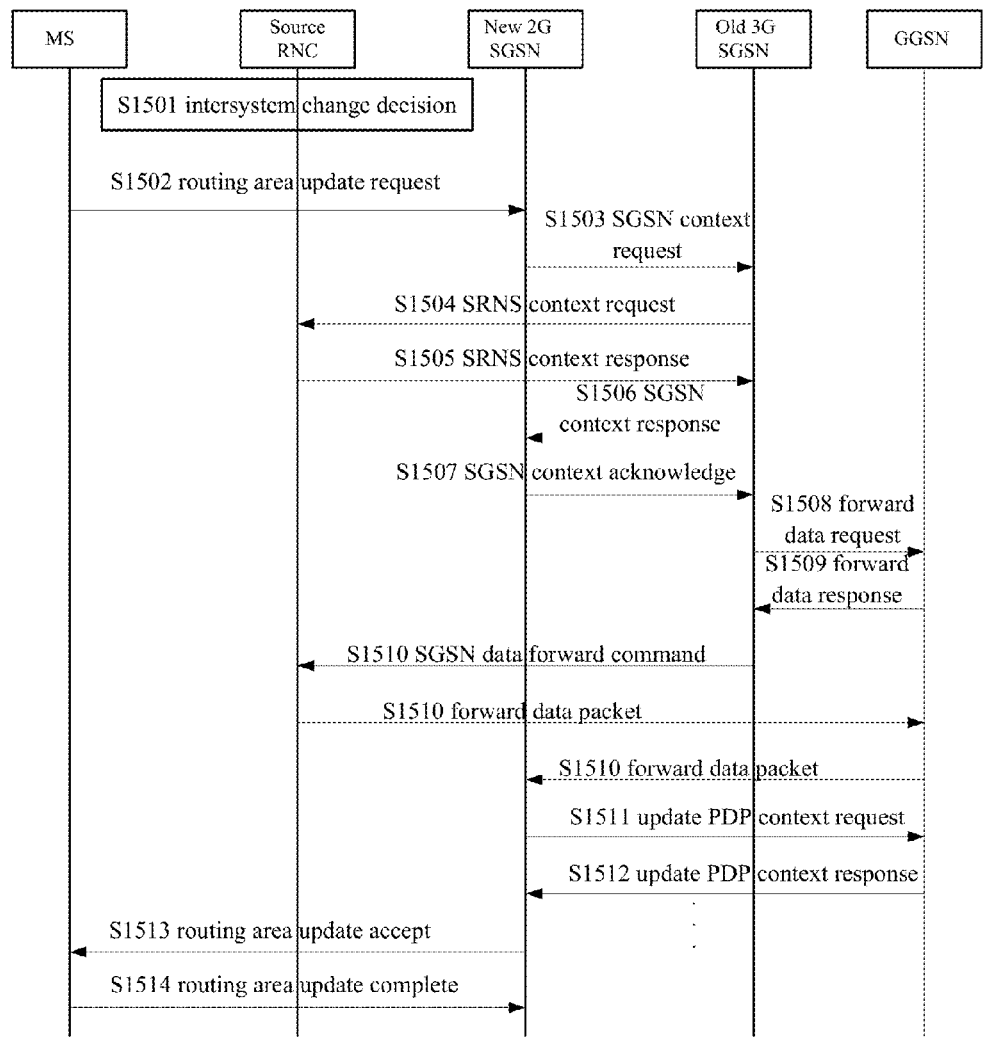
FIG. 15 is a flow chart of a data processing method when a change from a UTRAN to a GERAN takes place according to a second embodiment of the present invention.

With reference to FIG. 15, a data processing method when a change from a UTRAN to a GERAN takes place includes:

step S1501: an MS decides to initiate an intersystem change;

step S1502: the MS sends a routing area update request message to a new SGSN, i.e. 2G SGSN;

step S1503: the 2G SGSN sends an SGSN context request message to an old SGSN, i.e. 3G SGSN, to obtain user context;

step S1504: the 3G SGSN sends an SRNS context request message to a source RNC;

step S1505: the source RNC returns an SRNS context response message to the 3G SGSN, stops sending downlink data to the MS, and buffers the data;

step S1506: the 3G SGSN returns an SGSN context response message to the 2G SGSN, and carries the user context information in the message;

step S1507: the 2G SGSN sends an SGSN context acknowledge message to the 3G SGSN, informing the 3G SGSN that the 2G SGSN is ready to receive data packets;

step S1508: the 3G SGSN sends a forward data request to a GGSN, to request the GGSN to assign a data forwarding tunnel for data forwarding, an identifier of a data forwarding tunnel of the 2G SGSN is carried in the message, subsequently the GGSN will forward data of a lossless service to the data forwarding channel;

step S1509: the GGSN returns a forward data response message to the 3G SGSN, assigns a data forwarding tunnel identifier to the data forwarding tunnel, and carries the data forwarding tunnel identifier in the response message to the 3G SGSN;

step S1510: the 3G SGSN sends an SRNS data forward command to the source RNC, a data forwarding tunnel identifier carried in the message is the data forwarding tunnel identifier of the GGSN, the source RNC duplicates a buffered data packet and forwards to the GGSN, the GGSN forwards the data packet forwarded by the source RNC to the 2G SGSN on receipt of the data packet;

step S1511: the 2G SGSN sends an update PDP context request message to the GGSN;

step S1512: the GGSN returns an update PDP context response message to the 2G SGSN;

step S1513: the 2G SGSN returns a routing area update accept message to the MS;

step S1514: the MS returns a routing area update complete message to the 2G SGSN.

The data forwarding processing method stated above can be used for data forwarding when a handover or change between a GERAN/UTRAN system and an SAE system takes place.

When a handover or change from a GERAN system to an SAE system takes place, the MME and the UPE exchange messages including a forward data request message and a forward data response message, to obtain a data forwarding tunnel identifier of the UPE. Meanwhile the MME informs the UPE of a tunnel identifier of the access network side, and informs the 2G SGSN of the data forwarding tunnel identifier of the UPE. The 2G SGSN forwards a data packet to the UPE, and the UPE further forwards the data packet to the evolved access network.

When a handover or change from an SAE system to a GERAN system takes place, the MME and the UPE exchange messages including a forward data request message and a forward data response message, to obtain a data forwarding tunnel identifier of the UPE. Meanwhile, the MME informs the UPE of a tunnel identifier of the 2G SGSN, and then informs the evolved access network of the data forwarding tunnel identifier of the UPE. The evolved access network forwards a data packet to the UPE, and the UPE further forwards the data packet the 2G SGSN.

When a handover or change from a UTRAN system to an SAE system takes place, the 3G SGSN and the UPE exchange messages including a forward data request message and a forward data response message, to obtain a data forwarding tunnel identifier of the UPE Meanwhile, the UPE is informed of a tunnel identifier of the evolved access network side. Then the 3G SGSN informs the source RNC of the data forwarding tunnel identifier of the UPE. The source RNC forwards a data packet to the UPE, and the UPE further forwards the data packet to the evolved access network.

When a handover or change from an SAE system to a UTRAN system takes place, the MME and the UPE exchange messages including a forward data request message and a forward data response message, to obtain a data forwarding tunnel identifier of the UPE. Meanwhile the MME informs the UPE of a tunnel identifier of the targete RNC and then informs the evolved access network of the data forwarding tunnel identifier of the UPE. The evolved access network forwards a data packet to the UPE, and the UPE further forwards the data packet to the target RNC.

Another data processing method when an intersystem handover or change takes place is provided with an embodiment of the present invention, including:

A user plane anchor network element sends data to a source data forwarding network element and a target side processing network element on receipt of an instruction. The instruction may be a bicast command instruction instructing the user plane anchor network element to send data to the source data forwarding network element and the target side processing network element. On completion of update of user plane routing, the user plane anchor network element stops bicasting and sends data to the target side processing network element only.

Figure 16:
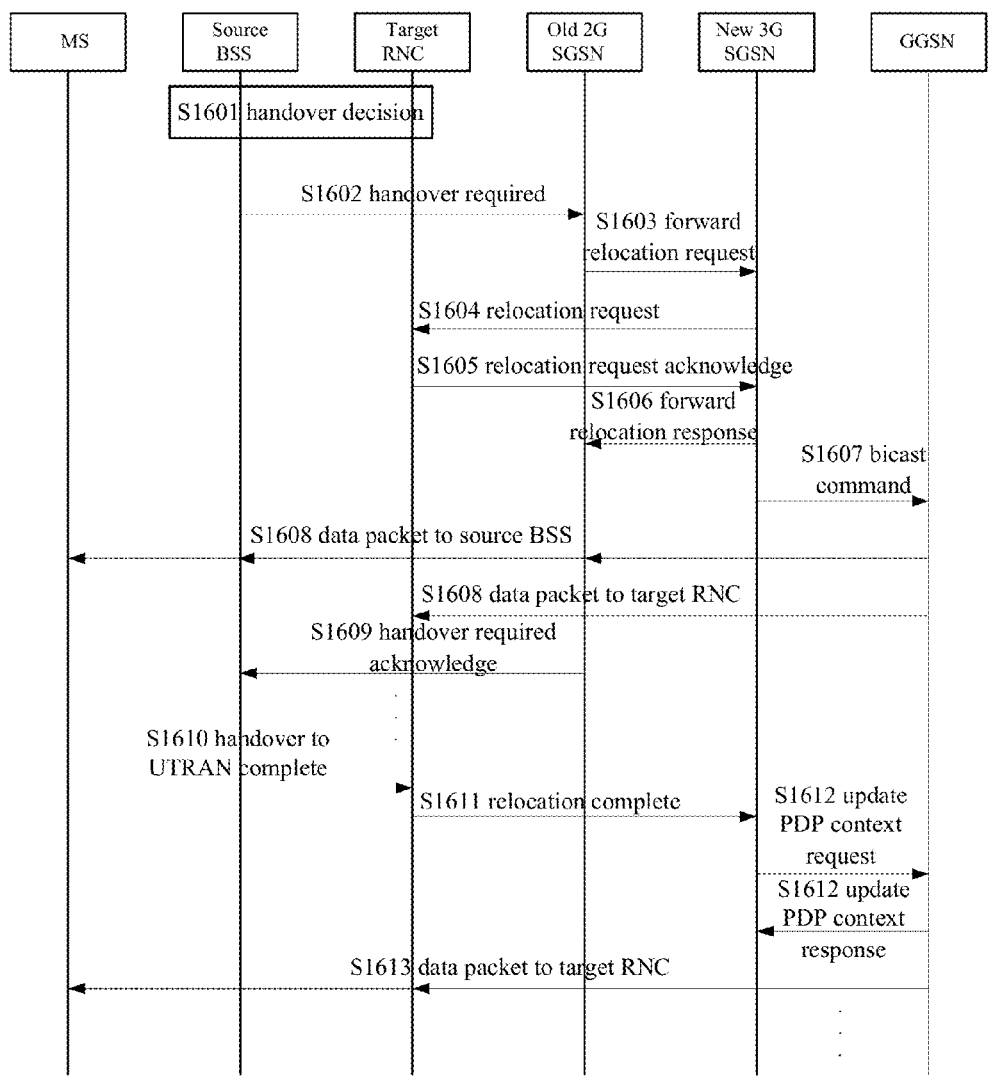
FIG. 16 is a flow chart of a data processing method when a handover from a GERAN to a UTRAN takes place according to a third embodiment of the present invention.

With reference to FIG. 16, a data processing method when a handover from a GERAN to a UTRAN takes place includes:
 step 1601: a source BSS decides to initiate a handover;
 step 1602: the source BSS sends a handover request message to an old SGSN, i.e. 2G SGSN;
 step 1603: the 2G SGSN sends a forward relocation request message to a new SGSN, i.e. 3G SGSN;
 step 1604: the 3G SGSN builds a relocation request message and sends the message to a target RNC;
 step 1605: the target RNC sends relocation request acknowledge message to the 3G SGSN;
 step 1606: the 3G SGSN sends a forward relocation response message to the 2G SGSN, an indication is carried in the message to instruct the 2G SGSN not to perform data forwarding;
 step 1607: the 3G SGSN sends a bicast command message to a GGSN, instructing the GGSN to send data to the 2G SGSN and the target RNC, a GTP tunnel identifier of the target RNC is carried in the message;
 step 1608: the GGSN sends a downlink data packet to the 2G SGSN and the target RNC;
 step 1609: the 2G SGSN sends a handover request acknowledge message to the source BSS;
 step 1610: an MS sends a handover to UTRAN complete message to the target RNC;
 step 1611: the target RNC sends a relocation complete message to the 3G SGSN;
 step 1612: a process of PDP context update is performed between the 3G SGSN and the GGSN, which changes a downlink GTP tunnel identifier of user in the GGSN to the GTP tunnel identifier of the target RNC, the GGSN stops data bicasting in the process;
 step 1613: the GGSN sends a downlink data packet to the target RNC.

Figure 17:
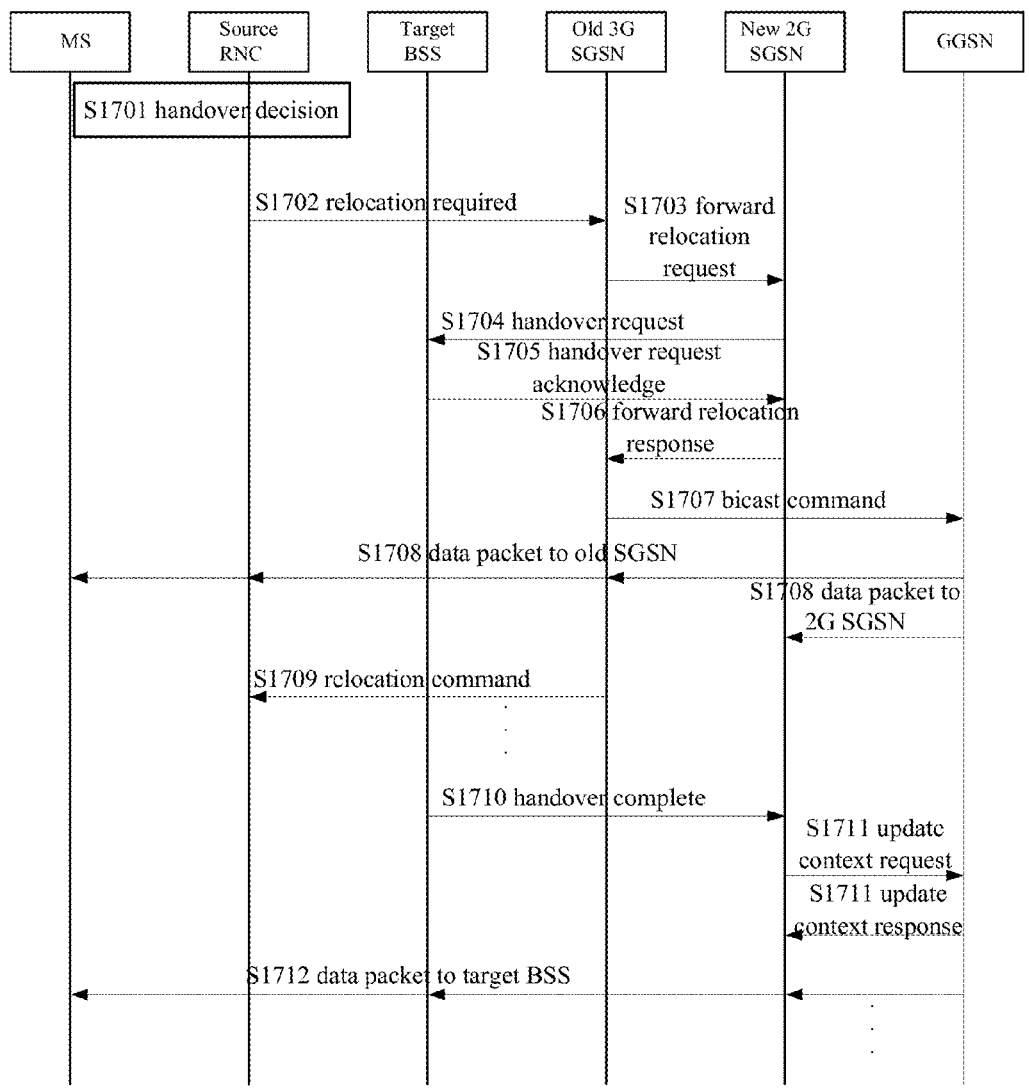
FIG. 17 is a flow chart of a data processing method when a handover from a UTRAN to a GERAN takes place according to a third embodiment of the present invention.

With reference to FIG. 17, a data processing method when a handover from a UTRAN to a GERAN takes place includes:
 step S1701: a source RNC decides to initiate a handover;
 step S1702: the source RNC sends a relocation request message to an old SGSN, i.e. 3G SGSN;
 step S1703: the 3G SGSN sends a forward relocation request message to a new SGSN, i.e. 2G SGSN;
 step S1704: the 2G SGSN builds a handover request message, and sends the message to a target BSS;
 step S1705: the target BSS sends a handover request acknowledged message to the 2G SGSN;
 step S1706: the 2G SGSN sends a forward relocation response message to the 3G SGSN;
 step S1707: the 3G SGSN sends a bicast command message to a GGSN, instructing the GGSN to send data to the source RNC and the 2G SGSN, a GTP tunnel identifier of the 2G SGSN is carried in the message;
 step S1708: the GGSN sends a downlink data pack to the source RNC and the 2G SGSN;
 step S1709: the 3G SGSN sends a relocation command message to the source RNC, an indication is carried in the message to instruct the source RNC not to perform data forwarding;
 step S1710: the target BSS sends a handover complete message to the 2G SGSN;
 step S1711: a process of PDP context update is performed between the 2G SGSN and the GGSN, which changes a downlink GTP tunnel identifier of user in the GGSN to the GTP tunnel identifier of the 2G SGSN, the GGSN stops data bicasting in the process;
 step S1712: the GGSN sends a downlink data packet to the 2G SGSN, the 2G SGSN sends the downlink data packet to the target BSS.

Figure 18:
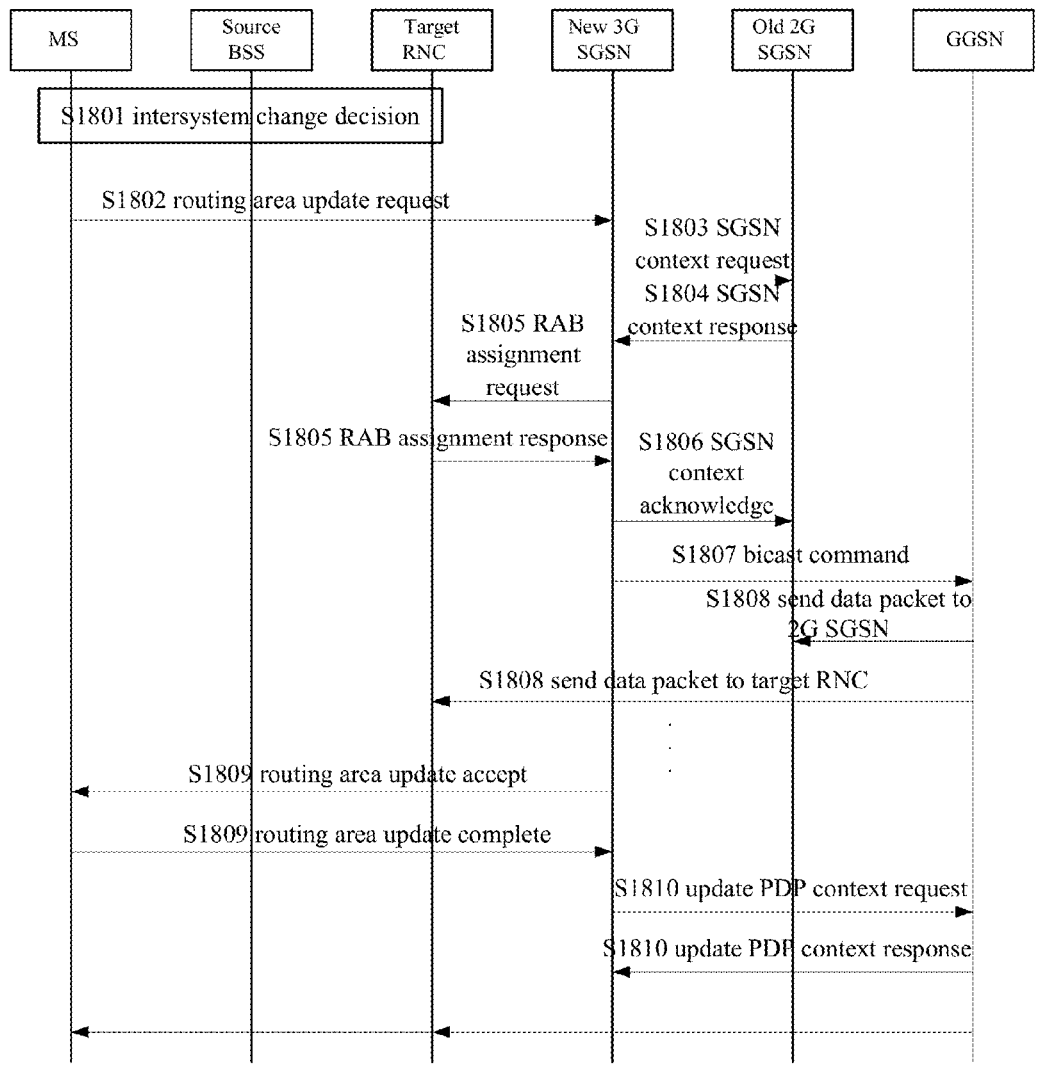
FIG. 18 is a flow chart of a data processing method when a change from a GERAN to a UTRAN takes place according to a third embodiment of the present invention.

With reference to FIG. 18, a data processing method when a change from a GERAN to a UTRAN takes place includes.
 step S1801: an MS decides to initiate an intersystem change;
 step S1802: the MS sends a routing area update request message to a new SGSN, i.e. 3G SGSN;
 step S1803: the 3G SGSN sends an SGSN context request message to an old SGSN, i.e. 2G SGSN, to obtain user context;
 step S1804: the 2G SGSN returns an SGSN context response message to the 3G SGSN, and carries the user context information in the message;
 step 1805: RAB assignment procedure is performed between the 3G SGSN and an RNC, thereby establishing RAB;
 step S1806: the 3G SGSN sends an SGSN context acknowledge message to the 2G SGSN, an indication is carried in the message to instruct the 2G SGSN not to perform data forwarding;
 step S1807: the 3G SGSN sends a bicast command message to the GGSN, instructing the GGSN to send data to the 2G SGSN and a target RNC, a GTP tunnel identifier of the target RNC is carried in the message;

step S1808: the GGSN sends a downlink data packet to the 2G SGSN and the target RNC;

step S1809: the 3G SGSN returns a routing area update accept message to the MS;

step S1810: the MS returns a routing area update complete message to the 3G SGSN;

step S1811: a process of PDP context update is performed between the 3G SGSN and the GGSN, which changes a downlink GTP tunnel identifier of user in the GGSN to the GTP tunnel identifier of the target RNC, the GGSN stops data bicasting in the process;

step S1812: the GGSN sends a downlink data packet to the target RNC.

Figure 19:
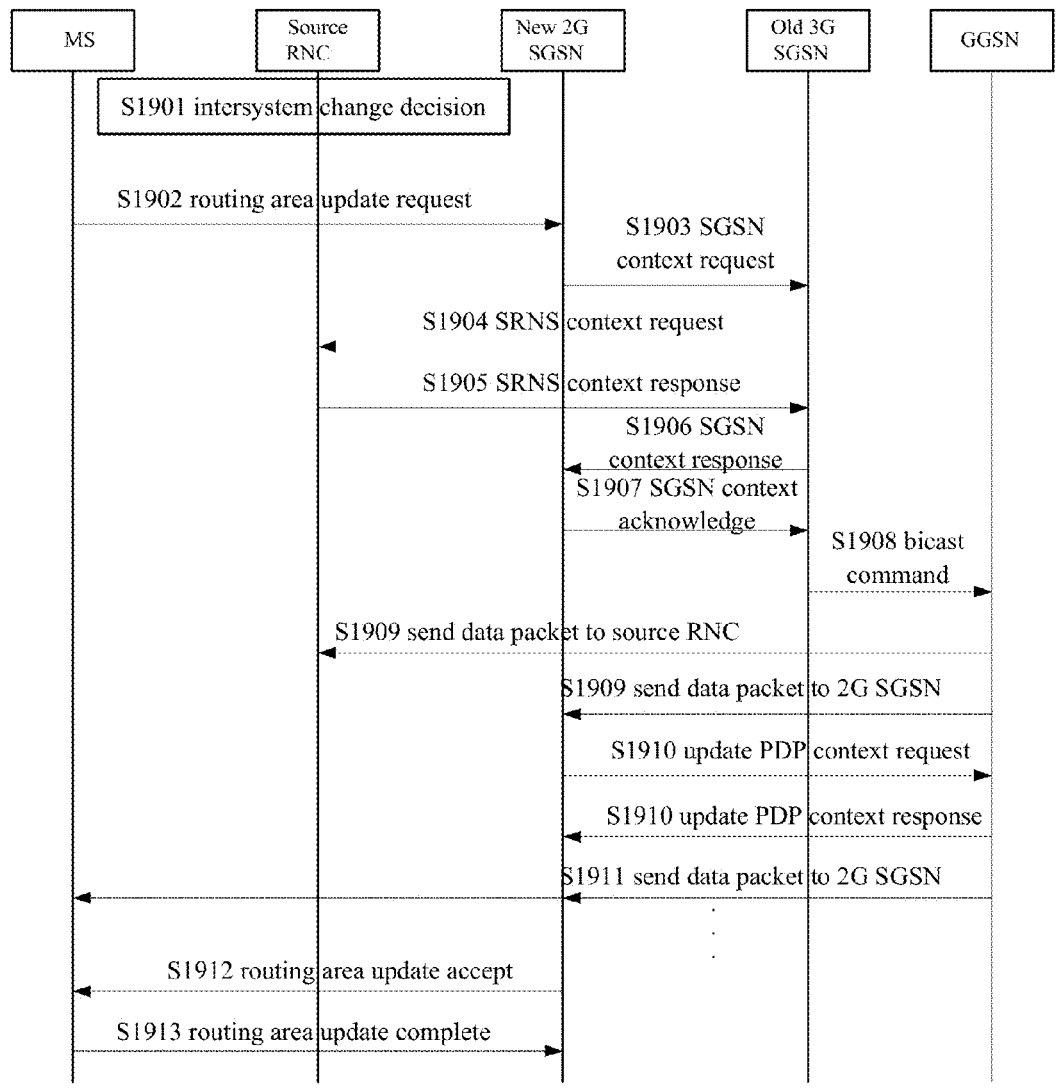
FIG. 19 is a flow chart of a data processing method when a change from a UTRAN to a GERAN takes place according to a third embodiment of the present invention.

With reference to FIG. 19, a data processing method when a change from a UTRAN to a GERAN takes place includes:

step S1901: an MS decides to initiate an intersystem change;

step S1902: the MS sends a routing area update request message to a new SGSN, i.e. 2G SGSN;

step S1903: the 2G SGSN sends an SGSN context request message to an old SGSN, i.e. 3G SGSN, to obtain user context;

step S1904: the 3G SGSN sends an SRNS context request message to a source RNC;

step S1905: the source RNC returns an SRNS context response message to the 3G SGSN, stops sending downlink data to the MS, and buffers the data;

step S1906: the 3G SGSN returns an SGSN context response message to the 2G SGSN, and carries the user context information in the message;

step S1907: the 2G SGSN sends an SGSN context acknowledge message to the 3G SGSN, informing the 3G SGSN that the 2G SGSN is ready to receive data packets;

step S1908: the 3G SGSN sends a bicast command message to the GGSN, instructing the GGSN to send data to the source RNC and the 2G SGSN, a GTP tunnel identifier of the 2G SGSN is carried in the message;

step S1909: the GGSN sends a downlink data packet to the source RNC and the 2G SGSN;

step S1910: a process of PDP context update is performed between the 2G SGSN and the GGSN, which changes a downlink GTP tunnel identifier of user in the GGSN to the GTP tunnel identifier of the 2G SGSN, the GGSN stops data bicasting in the process;

step S1911: the GGSN sends a downlink data packet to the 2G SGSN, the 2GSN sends the downlink data packet to the MS;

step S1912: the 2G SGSN returns a routing area update accept message to the MS;

step S1913: the MS returns a routing area update complete message to the 2G SGSN.

The data forwarding processing method stated above can be used for data forwarding when a handover or change between a GERAN/UTRAN system and an SAE system takes place.

When a handover or change from a GERAN system to an SAE system takes place, the MME sends a bicast command message to the UPE, instructing the UPE to send data to the 2G SGSN and the LTE. The UPE sends a downlink data packet to the 2G SGSN and the LTE. On completion of update of user plane routing, the UPE stops downlink data packet bicasting, and sends a downlink data packet to the LTE only.

When a handover or change from an SAE system to a GERAN system takes place, the MME sends a bicast command message to the UPE, instructing the UPE to send data to the LTE and the 2G SGSN. The UPE sends a downlink data packet to the LTE and the 2G SGSN. On completion of update of user plane routing, the UPE stops downlink data packet bicasting, and sends a downlink data packet to the 2G SGSN only.

When a handover or change from a UTRAN system to an SAE system takes place, the MME sends a bicast command message to the UPE, instructing the UPE to send data to the source RNC and the LTE. The UPE sends a downlink data packet to the source RNC and the LTE. On completion of update of user plane routing, the UPE stops downlink data packet bicasting, and sends a downlink data packet to the LTE only.

When a handover or change from an SAE system to a UTRAN system takes place, the MME sends a bicast command message to the UPE, instructing the UPE to send data to the LTE and the target RNC. The UPE sends a downlink data packet to the LTE and the target RNC. On completion of update of user plane routing, the UPE stops downlink data packet bicasting, and sends a downlink data packet to the target RNC only.

Figure 20:
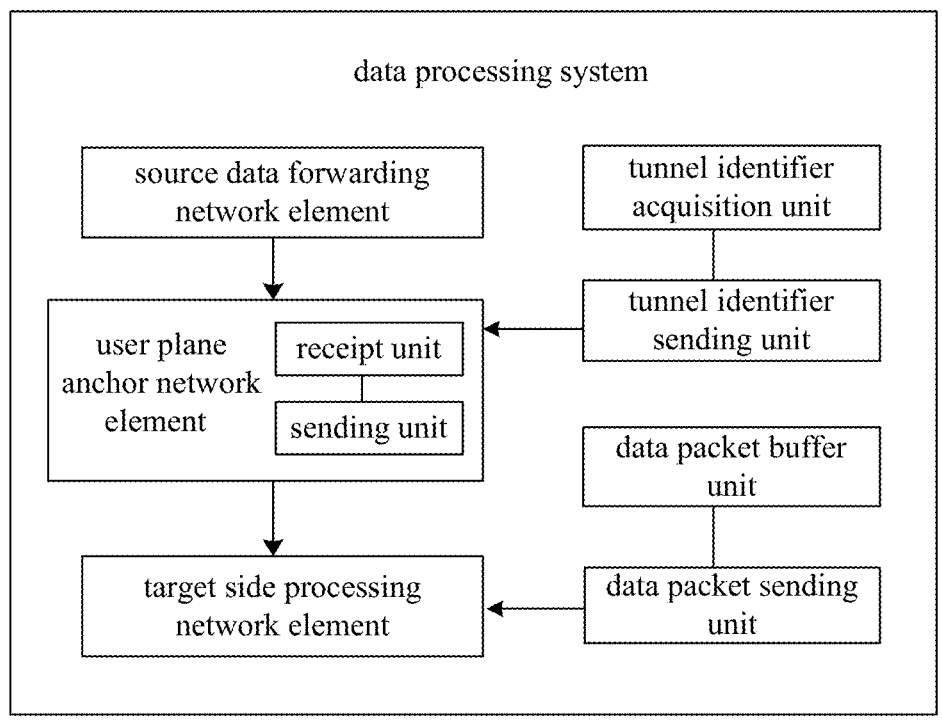
FIG. 20 is a structural diagram of a data processing system provided in an embodiment of the present invention.

With reference to FIG. 20, a data processing system is provided in an embodiment of the present invention, including a source data forwarding network element, a target side processing network element and a user plane anchor network element, wherein the user plane anchor network element is provided with a receipt unit adapted to receive data forwarded by the source data forwarding network element, and a sending unit adapted to forward the received data to the target side processing network element.

In an embodiment of the present invention, the source data forwarding network element is a 2G Serving GPRS Support Node (SGSN), the user plane anchor network element is a Gateway GPRS Support Node (GGSN), and the target side processing network element is a target Radio Network Controller (RNC).

In another embodiment of the present invention, the source data forwarding network element is a source RNC, the user plane anchor network element is a GGSN, and the target side processing network element is a 2G SGSN.

The data processing system further includes: a tunnel identifier acquisition unit, arranged in the 3G SGSN and adapted to acquire a data forwarding tunnel identifier of the GGSN; and a tunnel identifier sending unit, adapted to send a GTP tunnel identifier of the target RNC side to the GGSN.

The data processing system further includes: a data packet buffer unit, arranged in the GGSN and adapted to receive a data packet forwarded by the 2G SGSN and buffer a data packet forwarded by the target side processing network element; and a data packet sending unit, adapted to send the buffered data packet.

In the direct-tunnel mechanism, when a handover or change between a GERAN and a UTRAN takes place, data forwarded by the source data forwarding network element can be buffered in the data packet buffer unit, which forwards the buffered data packet to the target RNC when the GGSN completes update of user plane routing or the GGSN receives an update PDP context request message sent by the 3G SGSN. Also, the data forwarded by the source data forwarding network element can be forwarded directly to the target side processing network element.

When an intersystem handover or change takes place, interactions among the source data forwarding network element, target side processing network element and the user plane anchor network element are same or similar to the steps described in the above embodiments.

When the user plane anchor network element receive an instructive message and sends data to the source data forwarding network element and/or the target side processing network element, the user plane anchor network element updates user plane routing and only sends the data to the target side processing network element as instructed in the message according to the updated user plane routing.

Those skilled in the art should understand that each step in the above embodiments can be implemented by a program instructing related hardware. The program can be stored in computer readable storage medium such as ROM/RAM, magnetic disk and optical discs. Alternatively, the embodiments can be implemented with respective integrated circuit modules, or the steps of which can be made into separate integrated circuit modules. Therefore, the present invention is not limited to any particular hardware or software combination.

As can be seen from the above embodiments, with the data processing methods in the direct-tunnel mechanism when a handover or change between a GERAN and a UTRAN takes place, a GGSN can buffer data forwarded by a source data forwarding network element and then send the data to a target side processing network element, alternatively, the GGSN can send the data forwarded by the source data forwarding network element directly to the target side processing network element. The problem that the data processing method in the conventional art is not applicable in the direct-tunnel mechanism is solved. Handover or change between a GERAN and a UTRAN in the direct-tunnel mechanism does not affect forwarding of service data.

Exemplary embodiments of the present invention are described. It should be noted that those skilled in the art may make various alternations or modifications without departing from the principle of the present invention. The alternations and modifications should be covered within the scope of the present invention.

What is claimed is:

1. In a Mobility Management Entity (MME), a data processing method comprising:
    informing, by the MME, a User Plane Entity (UPE) of a data forwarding tunnel identifier of a target Radio Network Controller (RNC);
    obtaining, by the MME, a data forwarding tunnel identifier of the UPE; and
    informing, by the MME, a Long Term Evolution (LTE) access network of the data forwarding tunnel identifier of the UPE,
    wherein the data forwarding tunnel identifier of the UPE is used by the LTE access network to forward data to the UPE, and the data forwarding tunnel identifier of the target RNC is used by the UPE to forward the data received from the LTE access network to the target RNC.

2. The data processing method according to claim 1, wherein the step of obtaining the data forwarding tunnel identifier of the UPE comprises:
    sending, by the MME, a forward data request to the UPE; and
    receiving, by the MME, a forward data response carrying the data forward tunnel identifier of the UPE, from the UPE.

3. The data processing method according to claim 1, wherein the data forwarding tunnel identifier of the target RNC comprises an address and a Tunnel End Point Identifier (TEID) of the target RNC, and the data forwarding tunnel identifier of the UPE comprises an address and a TEID of the UPE.

4. A Serving GPRS Support Node (SGSN), comprising:
    a receiver configured to receive a data forwarding tunnel identifier of a User Plane Entity (UPE) from the UPE; and
    a sender configured to: send the data forwarding tunnel identifier of the UPE to a source Radio Network Controller (RNC), and send a data forwarding tunnel identifier of a Long Term Evolution (LTE) access network to the UPE,
    wherein the data forwarding tunnel identifier of the UPE is used by the source RNC to forward data to the UPE, and the data forwarding tunnel identifier of the LTE access network is used by the UPE to forward the data received from the source RNC to the LTE access network.

5. The SGSN according to claim 4, wherein the sender is configured to send a forward data request to the UPE, and the receiver is configured to receive a forward data response carrying the data forwarding tunnel identifier of the UPE, from the UPE.

6. The SGSN according to claim 4, wherein the data forwarding tunnel identifier of the LTE access network comprises an address and a Tunnel End Point Identifier (TEID) of an Evolved Node B (eNodeB) of the LTE access network, and the data forwarding tunnel identifier of the UPE comprises an address and a TEID of the UPE.

7. A Mobility Management Entity (MME), comprising:
    a receiver configured to receive a data forwarding tunnel identifier of a User Plane Entity (UPE) from the UPE; and
    a sender configured to: send the data forwarding tunnel identifier of the UPE to a Long Term Evolution (LTE) access network, and send a data forwarding tunnel identifier of a target Radio Network Controller (RNC) to the UPE,
    wherein the data forwarding tunnel identifier of the UPE is used by the LTE access network to forward data to the UPE, and the data forwarding tunnel identifier of the target RNC is used by the UPE to forward the data received from the LTE access network to the target RNC.

8. The MME according to claim 7, wherein the sender is configured to send a forward data request to the UPE, and the receiver is configured to receive a forward data response carrying the data forwarding tunnel identifier of the UPE, from the UPE.

9. The MME according to claim 7, wherein the data forwarding tunnel identifier of the target RNC comprises an address and a Tunnel End Point Identifier (TEID) of the target RNC, and the data forwarding tunnel identifier of the UPE comprises an address and a TEID of the UPE.

10. In a Mobility Management Entity (MME), a data processing method comprising:
    informing, by the MME, a User Plane Entity (UPE) of a data forwarding tunnel identifier of a Long Term Evolution (LTE) access network;
    obtaining, by the MME, a data forwarding tunnel identifier of the UPE; and
    informing, by the MME, a 2G Serving GPRS Support Node (SGSN) of the data forwarding tunnel identifier of the UPE,
    wherein the data forwarding tunnel identifier of the UPE is used by the 2G SGSN to forward data to the UPE, and the data forwarding tunnel identifier of the LTE access network is used by the UPE to forward the data received from the 2G SGSN to the LTE access network, wherein the step of obtaining the data forwarding tunnel identifier of the UPE comprises:

sending, by the MME, a forward data request to the UPE; and receiving, by the MME, a forward data response carrying the data forward tunnel identifier of the UPE, from the UPE.

11. In a Mobility Management Entity (MME), a data processing method comprising:

informing, by the MME, a User Plane Entity (UPE) of a data forwarding tunnel identifier of a Long Term Evolution (LTE) access network;

obtaining, by the MME, a data forwarding tunnel identifier of the UPE; and informing, by the MME, a 2G Serving GPRS Support Node (SGSN) of the data forwarding tunnel identifier of the UPE, wherein the data forwarding tunnel identifier of the UPE is used by the 2G SGSN to forward data to the UPE, and the data forwarding tunnel identifier of the LTE access network is used by the UPE to forward the data received from the 2G SGSN to the LTE access network, wherein the data forwarding tunnel identifier of the LTE access network comprises an address and a Tunnel End Point Identifier (TEID) of an Evolved Node B (eNodeB) of the LTE access network, and the data forwarding tunnel identifier of the UPE comprises an address and a TEID of the UPE.

* * * * *